(12) United States Patent
Ishii et al.

(10) Patent No.: US 6,277,519 B1
(45) Date of Patent: *Aug. 21, 2001

(54) METHOD FOR MAKING HYDROGEN STORAGE ALLOY POWDER AND ELECTRODE COMPRISING THE ALLOY POWDER

(75) Inventors: Masatoshi Ishii; Hiroyuki Miyamoto, both of Takefu; Genji Noguki; Hajime Kitamura, both of Ibaraki-ken, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/013,914

(22) Filed: Jan. 27, 1998

(30) Foreign Application Priority Data

Jan. 27, 1997 (JP) .................................................. 9-027253
Jan. 27, 1998 (JP) .................................................. 10-029251

(51) Int. Cl.[7] .......................... H01M 4/26; H01M 10/28
(52) U.S. Cl. ................... 429/218.2; 29/623.1; 420/900
(58) Field of Search ...................... 429/218.2, 59; 420/900; 29/623.1; 75/370

(56) References Cited

U.S. PATENT DOCUMENTS

| | | | |
|---|---|---|---|
| 5,496,424 | * 3/1996 | Fujitani et al. | 148/555 |
| 5,690,799 | * 11/1997 | Tsukahara et al. | 204/293 |
| 5,776,626 | * 7/1998 | Tsukahara et al. | 429/59 |
| 5,858,571 | * 1/1999 | Ishii et al. | 429/59 |
| 5,865,874 | * 2/1999 | Trainer | 75/362 |
| 5,879,429 | * 3/1999 | Yamamura et al. | 75/332 |

FOREIGN PATENT DOCUMENTS

| | | |
|---|---|---|
| 98101358 | 5/1999 | (EP) . |
| 61-176063 | 8/1986 | (JP) . |
| 63-291363 | 11/1988 | (JP) . |
| 5-190175 | 7/1993 | (JP) . |
| 5-225975 | 9/1993 | (JP) . |

OTHER PUBLICATIONS

Chemical Abstracts, vol. 119 No. 26, Dec. 27, 1993, Columbus, Ohio, US; abstract No. 275123, Kamiharashi, Seiji et al.; "Surface treatment of hydrogen–absorbing alloy anodes for secondary alkaline batteries" XP002057730 –& JP 05 190 175A (Matsushita Electric Ind Co Ltd, Japan) & Patent Abstracts of Japan, vol. 17, No. 608 (E–1457), Nov. 9, 1993 & JP 05 190175A (Matsushita Electric Ind Co JTD), Jul. 30, 1993.

J. D. Roberts et al: "Organic Chemistry—Methane to Macromolecules" 1974, Addison Wesley, California, USA, XP002063347 no month available.

* cited by examiner

*Primary Examiner*—Carol Chaney
(74) *Attorney, Agent, or Firm*—McDermott, Will & Emery

(57) ABSTRACT

A method for making hydrogen storage alloy powder comprises quenching a melt of a hydrogen storage alloy, breaking the quenched alloy into fine pieces provided that said alloy is in non-powder form after the quenching, and subjecting the fine pieces to treatment with a solution containing a conjugated unsaturated compound which has five or more conjugated π bonds in the molecule and a molecular weight of 100 or above.

16 Claims, No Drawings

METHOD FOR MAKING HYDROGEN STORAGE ALLOY POWDER AND ELECTRODE COMPRISING THE ALLOY POWDER

BACKGROUND OF THE INVENTION

1. Field of the Invention

This invention relates to a method for making hydrogen storage alloy powder having good hydrogen storage properties. More particularly, the invention relates to a method for making hydrogen storage alloy powder which exhibits good initial activity and ensures high capacity and prolonged life when applied to as a negative electrode of nickel-hydrogen secondary cells or batteries. The invention also relates to an electrode comprising the hydrogen storage alloy powder obtained by the method mentioned above.

2. Description of the Prior Art

After the discovery of hydrogen storage alloys capable of storing and releasing hydrogen, they have been applied not only to hydrogen storage means, but also to cells or batteries. In particular, alkaline secondary batteries have been already put into practice, and hydrogen storage alloys have been improved one by one to impart thereto higher capacity and more prolonged life. However, while intensive studies are continued, on one hand, on further improvements of the performance of lithium ion secondary batteries, which have been commercially sold in recent years, there is, on the other hand, a strong demand of development of a nickel hydrogen secondary battery which has higher capacity and longer life than existing counterparts.

As is well known in the art, hydrogen storage alloys have been predominantly prepared by a casting method and quenching method. It is also known that the properties of hydrogen storage alloys differ from each other depending on the manner of preparation.

In general, a negative electrode used in nickel hydrogen secondary batteries, makes use of hydrogen storage alloy powder obtained by breaking, into pieces, the hydrogen storage alloy prepared by the casting method. This electrode exhibits not only poor initial activity, but also insufficient capacity and life along with a poor shelf life.

Japanese Laid-open Patent Application Nos. 61-176063 and 5-225975 propose an electrode made of alloy powder of the type discussed above, which is further treated with an alkali and/or acid. Such electrode is improved in initial activity and capacity although not satisfactory, but its shelf life and cycle life are considerably degraded. Further, during the course of the surface treatment and in subsequent steps, the surface is inconveniently liable to deactivate. This could be avoided to a significant extent by further treatment of the electrode with a solution containing a specific type of compound, i.e. a highly conjugated unsaturated compound. However, satisfactory results have never been obtained with respect to the electrode life.

On the other hand, Japanese Laid-open Patent Application No. 63-291363 proposes an electrode using hydrogen storage powder, which is obtained by breaking, into pieces, the alloy prepared by the quenching method. This alloy suffers a reduced degree of segregation of elements with the electrode life being improved. However, the alloy surface appreciably undergoes oxidation, and the resultant electrode has initial activity and capacity lower than the case of the casting method, thus not withstanding use in practical application.

Under these circumstances, treatment with an alkali and/or acid has been studied on the hydrogen storage alloy powder obtained by the quenching method. In this case, the life is improved, but the initial activity, capacity and shelf life are not satisfactory from the standpoint of the practical use.

SUMMARY OF THE INVENTION

We have made intensive studies on the development of an electrode for high-performance nickel hydrogen storage alloy battery. As a result, it has been found that when the hydrogen storage alloy powder obtained by a quenching method is treated with a solution containing a highly conjugated unsaturated compound and is used to make an electrode of a nickel hydrogen storage alloy battery, the battery exhibits high capacity and long life.

It is accordingly an object of the invention to provide a method for making hydrogen storage alloy powder which is useful in making an electrode of a nickel hydrogen storage alloy secondary battery whereby a high capacity and long life of the battery are ensured.

It is another object of the invention to provide an electrode comprising the alloy powder of the type mentioned above.

The above objects can be achieved, according to the invention, by a method for making hydrogen storage alloy powder which comprises rapidly cooling or quenching a melt of a hydrogen storage alloy, breaking the alloy into fine pieces provided that the alloy is in non-powder form after the quenching, and subjecting the fine pieces to treatment with a solution containing a conjugated unsaturated compound which has five or more conjugated $\pi$ bonds in the molecule and a molecular weight of 100 or above.

DETAILED DESCRIPTION OF THE INVENTION

The composition of the hydrogen storage alloy used in the present invention are not critical, and is appropriately selected from those hydrogen storage alloys ordinarily used as negative electrode. Among such known hydrogen storage alloys, it is preferred to use $MmNi_5$ hydrogen storage alloys from the standpoint of life cycle in case of the alloys being used in secondary batteries. In the $MmNi_5$ alloys, Mm is Misch metal made of a mixture of rare earth elements such as La, Ce, Pr, Nd and the like. In the $MmNi_5$ hydrogen storage alloy, it is preferred to replace part of Ni with Mn so as to obtain a better cycle life. More preferably, part of Ni should be further replaced by Al and also by Co in addition to Mn and Al.

Most preferably, the hydrogen storage alloy of the invention should be one represented by the general formula, $(La)_xR_{1-x}Ni_aM_b$, in which R represents at least one element selected from Ce, Pr and Nd, M represents at least one element selected from Al, Co, Cu, Fe, Mn, Ti and Zr, x is a value of 0.2 to 1, (a+b) is a value of 4.0 to 6.0 provided that $0 < b \leq 2.0$.

In the practice of the invention, the hydrogen storage alloy powder is obtained by a procedure which comprises mixing individual elements to provide a mixture having a desired composition, melting the mixture in an atmosphere of an inert gas such as Ar, He or the like, or in vacuum at a temperature ranging from 1300 to 1600° C., quenching the resultant melt, preferably in the form of a ribbon, followed by breaking the resultant alloy into fine pieces, if necessary. Any limitation is not placed on the manner of the quenching, and it is preferred from the standpoint of safety and efficiency to use any of a revolving roll method, a gas atomizing method, or a rotary disc method. The revolving roll method may make use of either a single roll or a twin roll.

The term "quenching" used herein means cooling at a rate of 100° C./second or higher, and the cooling rate is preferably in the range of $10^3$ to $10^{5°}$ C./second. If the cooling rate is lower than $10^{2°}$ C./second, the cooling capacity becomes so low that the resultant alloy may undergo segregation, resulting in the great strain involved in the alloy pieces.

According to the revolving method, an alloy melt is run over a cooling roll or rolls. While rotating the roll, the alloy melt is quenched at such a cooling rate as defined above to obtain a ribbon alloy. The ribbon is subsequently subjected to a wet or dry milling machine such as a jet mill, ball mill or the like to obtain an alloy powder. The powder usually has an average size of 5 to 100 μm.

When using the gas atomizing method, a fine stream of an alloy melt is quenched while flowing a high-speed gas against the stream. The quenched alloy is obtained as powder in spherical form, similar round form and the like. The high-speed gas may be made of an inert gas such as argon, helium or the like, with the gas being pressurized at 10 $kgf/cm^2$ or above.

According to the rotary disc method, the alloy melt is vertically dropped onto a disc being rotated substantially at the center thereof, whereupon the melt is radially spread along the disc surface by the agency of the rotation of the disc and thus quenched. In this case, alloy powder in spherical form can be obtained. The disc is usually rotated at 10,000 to 30,000 r.p.m.

Among these quenching methods, it is particularly preferred in the practice of the invention to use to the roll quenching method.

Using any of the above quenching methods, the resultant alloy powder has an average particle size of 5 to 100 μm. The powder is subsequently subjected to surface treatment.

The alloy powder obtained according to the quenching method has a lattice strain which is reduced to a level of 0.1% or below on calculation from the powder X-ray diffractometry (XRD). The lattice strain is calculated according to the calculation equation obtained by use of the Wilson method of analyzing the size and lattice strain of crystallite (the application software of the Wilson method is commercially available from Rigaku Electric Co. Ltd. under the designation of RINT 2000 Series, MJ13028A02).

It will be noted that the lattice strain depends on the degree of cooling and that a less strain results in a less degree of segregation of the constituent elements. This leads to a prolonged life when the powder is applied to as an electrode of battery.

Preferably, the alloy obtained after the quenching is thermally treated under conditions of 800 to 1200° C. and 5 to 12 hours prior to or after the breakage into fine pieces.

In order to provide hydrogen storage alloy powder which is adapted for use as an electrode of a nickel hydrogen storage alloy battery having high capacity and long life and which has good shelf life and handling properties, the hydrogen storage alloy powder thus obtained in the form of the fine pieces is treated with a solution containing a highly conjugated unsaturated compound.

The treating solution may be acidic, neutral or alkaline in nature, of which an acidic or alkaline solution is preferably used. Prior to the treatment, the powder may be pretreated with an acid or alkali.

The acid used in the present invention is not critical, and may be appropriately selected from known mineral acids. Preferably, at lest one acid selected from hydrochloric acid, sulfuric acid and nitric acid, of which hydrochloric acid is more preferred.

The alkali is not critical in type as well, and may be appropriately selected from known alkalis. Preferably, at least one alkali selected from lithium hydroxide, sodium hydroxide and potassium hydroxide is used, of which lithium hydroxide is preferably used.

The treating temperature is room temperature or above. Preferably the temperature ranges from room temperature to 150° C., more preferably from 60° C. to 110° C. If necessary, the treatment may be performed in a closed vessel under a pressure of not higher than 10 $kgf/cm^2$. The treatment under heating or cooling conditions needs additional equipment for industrial production, thus becoming poor in economy. In particular, the treatment under cooling conditions takes a long treating time and is not beneficial in practical application.

The treating time should preferably range from about 0.1 to 10 hours. A shorter treating time is sufficient under higher temperature conditions, and a longer time is necessary for lower temperature conditions.

The concentration in a treating bath is preferably in the range of about 0.1 to 1.0 N for mineral acid and in the range of about 1.0 to 10 N for alkali. The highly conjugated unsaturated compound should preferably be present in an amount of 0.1 to 10 parts by weight per 100 parts by weight of the hydrogen storage alloy to be treated.

If the concentration of an acid or alkali is lower than the above-defined range, satisfactory activity thereof may not be expected. On the other hand, if the concentration is too high, the treatment proceeds to the inside of alloy powder, resulting in a reduced amount of hydrogen to be adsorbed. Further, if the content of the unsaturated compound is lower, shelf life degrades. Larger contents of the unsaturated compound impede adsorption and release reactions of hydrogen with the alloy, thus reducing the amount of hydrogen to be stored in the alloy.

The highly conjugated unsaturated compounds useful in the present invention include aromatic compounds and heterocyclic compounds, both having five or more conjugated π bonds in the molecule. The term "conjugated π bonds" used in the specification means two or more double bonds and/or triple bonds which are in conjugated relation.

The highly conjugated unsaturated compounds should preferably have an average molecular weight of 100 or over, more preferably 200 or over, and most preferably from 200 to 50,000. If compounds having smaller than five π bonds are used, good initial activity cannot be expected.

The aromatic compounds having five or more conjugated π bonds include, for example, benzene derivatives, naphthalene derivatives, quinones, and nonbenzenoid aromatic compounds. Examples of the heterocyclic compounds having five or more conjugated π bonds include oxygen-containing heterocyclic compounds, nitrogen-containing heterocyclic compounds, sulfur-containing heterocyclic compounds, bicyclic compounds having a sharing nitrogen atom, alkaloids, and the like. Of these, polynuclear aromatic compounds are preferred as aromatic compound, and oxygen-containing and nitrogen containing heterocyclic compounds preferred as heterocyclic compound.

Specific examples of these compounds are cited below.

The benzene derivatives include: phenols and derivatives thereof such as, for example, 2,6-di-tert-butylphenylphenol, catecholphthalene, 2,2-diphenylolpropane, 3,7-dioxy-10-methylxanthene, phenolphthalein, 7-oxy-2,4-dimethylbenzopyroxonium chloride, oxyanthraquinone, purpurogallin, gallein, diphenyl ether, α-methoxyphenazine, chloroglucide, 2,3-dioxyanthraquinone, 5,7-dioxy-4- methylcoumarine, dioxyacridone, salicyclic acid, α-phenylbutyrophenyl, N-2,4-dinitrophenyl-N-phenylhydroxyamine, acetophenone, 1-(4-nitrophenyl)-3,5-dimethylpyrazole, and 9,10-diphenylphenanthrene;

- aromatic amines and derivatives thereof such as, for example, N-phenyl-p-benzoquinodimine, quinoline, Saferanine B, Rosaniline, spirit-soluble insulin, aniline black, p-rosanilin, Methyl Violet, Methyl Orange, Methyl Red, indigo, carbazole, Methylene Blue, o-phenanthroline, p-phenanthroline, 3,6-diaminoacridine, Indanthrene Scarlet 2G, 4-aminodiphenylamine, Acridine Yellow, 3-aminophenothiazine, N'-diphenyl-p-phenylenediamine, Rhodamine, 7-amino-4-methylcoumarin, 2-aminophenazine, phenothiazine, diphenylamine, N-methyldiphenylamine, N-phenyltolylamine, ditolylamine, 2-oxy-4-methylquinoline, Hansa Yellow G, N,N-diphenylformamidine, phenanthrophenazine, Bismarck Brown G, 2,3-diaminophenazine, 2-aminodiphenylamine, Chrysoidine R, 2,3,7,8-tetraaminophenazine, aminophenoxazone, oxyphenaxazone, triphenedioxazine, 2,4-dinitrophenoxazine, p-nitrosodiphenylhydroxylamine, and 2',4'-dinitro-4-oxy-3-aminophenlamine;
- nitro and nitroso derivatives such as, for example, p-phenazine, phenazine oxide, 1-phenylazo-2-naphthol, triphendioxazine, 4-nitroxanthone, and 4'-nitroso-2-nitrodiphenlamine;
- phenylhydroxylamine derivatives such as, for example, 4,4'-dinitrodiphenylamine, bis(β-phenylhydrazine) oxalate, bis(β-phenylhydrazine) malonate, bis(β-phenylhydrazine) succinate, and bis(β-phenylhydrazine) phthalate;
- aromatic halides such as biphenyl chloride;
- aromatic aldehydes such as, for example, 2-phenyl-1-benzylbenzimidazole, Leucomalachite Green, Malachite Green, tetrachlorohydroquinone monobenzoate, benzoflavin, 2-phenylbenzthiazole, 4-benzhydrylbenzaldehyde, bisphenylhydrazone, and bis(4-nitrophenyl)hydrazone;
    - aromatic ketones such as, for example, triphenylisoxazole, benzophenone potassium, 4-methylbenzophenone, p-toluic acid anilide, toluidide benzoate, juryl phenyl ketone, 2,4,2',4'-tetramethylbenzophenone, chalcone phenyl hydrazone, 1,3,5-triphenylhydrazoline, and dinitrobenzyl. Examples of benzoic acids, phthalic acids and derivatives thereof include quinizarin and nitrodiphenyl ether;
    - benzene derivatives having one substituent other than aldehyde group such as, for example, disalicylaldehyde, coumarin, 2-benzoylcoumarone, 1-oxy-2,4-dimethylfluorone, 3-phenylcoumarone, ethyl coumarin-3-carboxylate, 3-acetylcoumarin, hydrovaniloin, 4-oxy-3-methoxy-co-nitrostyrene, α-(nitrophenyl)-β-benzoylethylene oxide, dinitrophenylindazole, 5-chloro-3-(4-xyphenyl) anthranyl, 3-nitroacridone, 6-nitro-3-phenylanthranyl, 2,8-dimethyl-1,9-anthrazoline, carbostyril, 1,3-dioxyacridine, hydroxyquinacine, phlorchinyl, 2-methylquinazoline, 3-acetyl-2-methylquinoline, 2-hydroxy-3-phenylquinoline, 3-nitroquinoline, and quinoline-2,3-dicarboxylic acid ester;
    - benzene derivatives having one substituent other than acyl group such as, for example, 7-oxyflavanone, 7-oxyflavone, 7,8-dioxyflavone, 7-acetoxy-4-methyl-3-phenylcoumarin, 7,8-diacetoxy-4-methyl-3-phenylcoumarin, o-oxybenzophenone, xanthone, 2-phenylbenzoxazole, m-oxybenzophenone, p-oxybenzophenone, 2-benzoylxanthone, 2,4-dioxybenzophenone, 2,5-dioxybenzophenone, 2,2'-dioxybenophenone, xanthene, aurin, trioxybenzophenone, 6,7-dimethoxy-3-phenylcoumarone, o-nitrobenzophenone, m-nitrobenzophenone, 4,4'-dibenzoylazoxybenzene, 2-(2-aminophenyl)-4-methylquinone, 2-oxy-4-methylquinone, acridone, 2,4-dmethylquinazoline, 3-cyano-2-oxy-4-methylquinoline, fluorene, anhydro(2-aminobenzophenone)dimer, 2-oxy-3-phenylindazole, 3-phenylindazole, 2-phenylbenzimidazole, 2-methyl-8-benzoylquinoline, 2-methyl-4-phenylquinoline, 4-phenyl-2-quinazolone, aminobenzophenone, chlorobenzophenone, diaminobenzzophenone, 3-triazine-3-oxide, 7-methyl-3-phenyl-4,5-benzo-1,2,6-oxydiazine, 4,4'-bisdimethylaminobenzophenone, 4,4'-bisdimethylaminobenzophenoneimide, 2,4-dinitro-9-phenylacridine, and 4,4'-dibenzoyldiphenyl;
- benzene and toluene derivatives having at least three substituents which differ from one another such as, for example, tetramethoxyindigo, 5,6,5',6'-bismethylenedioxyindigo, 7-acetoxy-8-methoxy-3-(2-nitrophenyl)carbostyryl, 2,2'-dinitrodipheyldisulfido-4,4'-dialdehyde, 6-chloro-3-benzoylflavone, and 1,3,8-trinitrophenoxazine. Examples of aralkyl compounds include 9-benzylacridine;
- diazo and azo compounds such as, for example, azobenzene, azotoluene, 2,2-dimethoxyazobenzene, 4,4'-dichloroazobenzene, 1,1'-azonaphthalene, 2,2'-dioxyazobenzene, 2,2'-dioxy-5,5'-dimethylazobenzene, p-bromoazobenzene, p-nitroazobenzene, and phenozobenzene; and
- aromatic unsaturated compounds such as, for example, 2,3,4,5-tetraphenylcyclopentan-2-en-1-on, 1,2,3-triphenylazulene, 2,2'-dimethyldiphenylacetylene, 4,4-diethyldiphenylacetylene, 3,4,3',4'-tetramethyldiphenylacetylene, 2,2'-dichlorodiphenylacetylene, 2,2'-dibromodiphenylacetylene, 2-nitrodiphenylacetylene, 2,2'-dinitrophenylacetylene, 2,2'-diaminodiphenylacetylene, 2,2'-dimethoxydiphenylacetylene, stilbene, α-stilbene, α-ethylstilbene, α,β-dimethylstilbene, α,β-diethylstilbene, α,β-dichlorostilbene, α,β-dibromostilbene, 2-chlorostilbene, 4,4'-diiodostilbene, α-nitrostilbene, α,β-dinitrostilbene, 2,4,6-trinitrostilbene, 2-aminostilbene, 2,2'-diaminostilbene, 4,4'-di(dimethylamino)stilbene, 2,2'-dicyanostilbene, 2-oxystilbene, 2-methoxstilbene, 2,2'-dioxystilbene, 2,2'-dimethoxystilbene, 4,4'-dialkoxystilbene, and 3,5,2',4'-tetraoxystilbene. Examples of polyphenyls and derivatives thereof include biphenyl, terphenyl, quaterphenyl, quinquiphenyl, sexiphenyl, septiphenyl, octiphenyl, nobiphenyl, deciphenyl and the like.

Examples of naphthalene derivatives include:

alkyl, alkenyl and phenylnaphthalenes such as 1-methylnaphthalene, 2-methylnaphthalene, 1-ethylnaphthalene, 2-ethylnaphthalene, 1,2-dimethylnaphthalene, 1,4-dimethylnaphthalene, 1,5-dimethylnaphthalene, 1,6-dimethylnaphthalene, 1,7-dimethylnaphthalene, 2,3-dimethyhlnaphthalene, 2,6-dimethylnaphthalene, 2,7-dimethylnaphthalene, 1-poropylnaphthalene, 1-isopropylnaphthalene, 2-isopropylnaphthalene, trimethylnaphthalene, diisopropylnaphthalene, 1-vinylnaphthalene, 2-vinylnaphthalene, 1-propylnaphthalene, 1-allylnaphthalene, 1-isopropenylnaphthalene, 2-isopropenylnaphthalene, 1-phenylnaphthalene, 2-phenylnaphthalene, 1,4-diphenylnaphthalene, and 1,2,4-triphenylnaphthalene;

dinaphthyls such as 1,1'-dinaphthyl, 1,2'-dinaphthyl, and 2,2-dinaphthyl, and examples of naphthylarylmethanes include 1-benzylnaphthalene, 2-bnezylnaphthalene, 1-(α-chlorobenzyl)naphthalene, 1-α,α-dichlorobenzyl)naphthalene, diphenyl-α-naphtylmethane, diphenyl-β-naphthylmethane, 1,8-dibenzylnaphthalene, di-β-naphthylmethane, α-naphthyl-β-naphthylmethane, and di-β-naphthylmethane;

naphthylarylethanes such as 1-phenetylnaphthalene, 1,2-di-α-naphthylethane, 1,2-di-β-naphthylethane, and 1,1-α-dinaphthylethane, and examples of hydronaphthalenes include 1,2-dihydronaphthalene, 1,4-dihydronaphthalene, and 1,2,3,4-tetrahydronaphthalene;

nitronaphthalenes and derivatives thereof such as dinaphthopyridazine, 7,8-benzoquinone, 5,6-benzoquinone, naphthazalin, diperimidine, nitromethylnaphthalene, nitroalkylnaphthalene, nitrophenyl naphthalene, halonitronaphthalene, halodinitronaphthalene, nitrosonaphthalene, dinitrotetrarine, dibenzophenazine, methylbenzoindole, 9-chloro-1-azanthracene, quinolinoquinoline, 1,2,3-triazaphenalene, perimidone, perimidine, dibenzoacridine, benzophenazine-12-oxide, diaminonaphthalene, triaminonaphthalene, tetraaminonaphthalene, N-ethyl-α-naphthylamine, N-methylnaphthylamine, N,N-dimethylnaphthylamine, N-methyl-N-ethylnaphthylamine, trimethylnaphthylammonium salt, N-phenylnaphthylamine, N-benzylnaphthylamine, N-naphthylethylenediamine, N-naphthylglycin, N-β-cyanomethylnaphthylamine, N-cetylnaphthylamine, N-formylnaphthylamine, N-benzoylnaphthylamine, N-phthaloylnaphthylamine, aminomethylnaphthalene, nitronaphthylamine, dinitronaphthylamine, halonitronaphthylamine, aminotetralin, and diaminotetralin;

halogenated naphthalenes such as 1-fluoronaphthalene, 1-chloronaphthalene, 1-chloro-3,4-dihydronaphthalene, 1-iodonaphthalene, 1-bromonaphthalene, 1-chloro-4-chloromethylnaphthalene, 1-bromo-2-bromomethylnaphthalene, 1,4-difluoronaphthalene, 1,2-dichloronaphthalene, 1,6-dichloronaphthalene, 1,7-dichloronaphthalene, 1,5-dichloronaphthalene, 1,8-dichloronaphthalene, 2,3-dichloronaphthalene, 1,4-dibromonaphthalene, 1,4-diiodonaphthalene, perylene, 1,2,3-trichloronaphthalene, 1,2,4-tribromonaphthalene, 1,2,3,4-tetrachloronaphthalene, 1,4,5-tribromo-3,8-dimethylnaphthalene, 1,3,6,7-tetrachloronaphthalene, 1,3,5,8-tetrabromonaphthalene, and 1,2,3,4,5-pentachloronaphthalene;

naphthylhydroxylamines, naphthylpyrazines and naphthyl ureas such as a-naphthylhydroxylamine, N'-phenyl-N-α-naphthyl-N-oxyurea, β-naphthylthiohydroxylamine, N-nitroso-α-naphthylhydroxylamine, neocupherron, 2-oxy-1,1'-azonaphthalene, α-naphthylhydrazine, 1,2-dibenzocarbazole, 4,4-diamino-1,1'-binaphthyl, 3,4-benzcarbazole, 2,2'-diamino-1,1'-binaphthyl, N'-acetyl-N-β-naphthylhydrazine, N'-(lauroyl-N-β-naphthylhydrazine, N'-phenyl-N-α-naphthylhydrazine, N'-(2,4-dinitrophenyl)-N-α-naphthylhydrazine, 2-α-naphthyl-5-nitrobenztriazole, N,N'-di-α-naphthylhydrazine, 1,1'-diamino-2,2'-binaphthyl, N,N'-di-5-tetralylhydrazine, N'-(2,4-dinitrophenyl)-N-β-naphthylhydrazine, 2-β-naphthyl-5-nitrobenztriazole, N-triphenylmethyl-N-β-naphthylhydrazine, N,N'-di-β-napthylhydrazine, N-methyl-N-(2,4-dinitro-1-naphthyl)hydrazine, 2-amino-(naphtho-1',2':4,5-thiazole), 1,2:5,6-dibenzophenazine, 2-amino-(naphtho-2',1':4,5-thiazole), 2,3-dihydrodinonaphthalene, 2-phenyl-1,3-bisbenzylidenamino(naphtho-2',3':4,5-imidazoline), N-acetyl-α-naphthylnitrosoamine, N-ethyl-α-naphthylnitrosoamine, N-phenyl-α-naphthylnitrosoamine, α,α'-dinaphthylnitrosoamine, bis(β-naphthylnitrosoamide) succinate, N-ethyl-β-naphthylnitrosoamine, N-phenyl-β-naphthylnitrosoamine, N-acetyl-2-methyl-1-naphthylnitrosoamine, 4,5-benzindazole, naphthylnitrosoamine, 1-nitro-2-naphthylamine, α-naphthylurea, N,N'-di-α-naphthylurea, 4-chloro-1-naphthylcarbamoyl chloride, 2,4'-dichloro[naphtho-1',2':4,5-thiazole], 2-mercapto[naphtho-1',2':4,5-htiazole], 2-chloro-[naphtho-1',2':4,5-thiazole], 2-mercapto[naphtho-2',1':4,5-thiazole], and 2-chloro[naphtho-2',1':4,5-thiazole];

naphthalene-based aralkyl compounds such as dibenzanthrcene, acenaphthene, α-chloroethylnaphthalene, phenylnaphthylchloromethane, diphenylnaphthylchloromethane, nitromethylnaphthalene, aminomethylnaphtalene, (naphthylmethyl)amine, α-phenyl(naphthylmethyl)amine, N-benzyl(naphthylmethyl)amine, trimethyl(naphthylmethyl)ammonium salt, tri(naphthylmethyl)amine, di(naphthylmethyl)amine, (β-naphthylethyl)alcohol, dimethylnaphthylcarbinol, phenylnaphthylcarbinol, diphenylnaphthylcarbinol, 9-phenylbenzofluorene, naphthylpropylene oxide, ethyl(naphthylmethyl) ether, phenyl(naphthylmethyl) ether, naphthylacetaldehyde, naphthylacetone, ω-naphthylacetophenone, acenaphthenone, dihydrophenalone, phenalone, benzoindanone, naphthylacetonitrile, 9,9'-dichlorodibenzofluorene, α-nitro-β-naphthylethylene, γ-naphthylallyl alcohol, β-naphthylacrolein, methyl(β-naphthylvinyl)ketone, and naphthylphenanthrene dicarboxylic acid anhydride;

naphthols and naphthalenesulfonic acids such as 9-oxynaphthacenequinone, 2'-naphthalene-2-indole indigo, 1-methoxynaphthalene, 1-ethoxynaphthalene, 1-phenoxynaphthalene, α-naphthol salicylic acid ester, β-naphthol, α-naphthol, α-naphthol salicylic acid ester, α-naphthol acetic acid ester, phenyl-β-oxynaphtylbenzaliminomethane, β-naphtholphenylmethylamine, methylene-di-β-naphthol, dinaphthopyran, 1'-naphthol-2-indole indigo, 2-methoxynaphthalene, 2-ethoxynaphthalene, N-p-oxyphenyl-naphthylamine base, β-naphthol salicylic acid ester, 2-methyl-1-naphthol, 1,2-napthamethlenequinone, 1,2-dioxyanphthalene, naphthaleneindole indigo, α,β-naphthophenoxazine, β,γ-naphthophenoxazine, 4-oxy-10-methyl-1',2'-benzocarbazole, dioxynaphthofluolan, dianphthoquinone, 2,6-naphthoquinone, oxybenzoacridine, 9-oxy-3-dimethylaminonaphthophenoxazine, 1,2,4-trioxynaphthalene, 1,4,5,6-tetraoxynapthalene, thio-α-naphthol, 4-mercapto-1-naphthol, 1,5-naphthalenedithiole, methyl-α-naphthylsulfide, 1,1'-naphthylsulfide, 1,1'-thiodi-2-naphthol, 1,1'-naphthyldisulfide, 1,1'-dithiodi-1-naphthol, thio-β-naphthol, naphtholthioindigo, 1-amino-2-naphthalenethiole, napthothianthrene, and 2-mercapto-1,2-naphthothiazole;

naphthoaldehydes and derivatives thereof such as α-naphthoaldehyde, 2-(2,4-dinitrophenyl)-1-(α-naphthyl)ethylene, 2-methyl-1-naphthoaldehyde, 2,3-dimethyl-1-naphthoaldehyde, 4-bromo-1-naphthoaldehyde, 4-nitro-1-naphthoaldehyde, 2,4-dinitro-1-naphthoaldehyde, 4-amino-1-naphthoaldehyde, 2-hydroxy-1-naphthoaldehyde, 1-naphthalene-2'-indole indigo, 1,2-bis(2-hydroxy-1-naphthyl)ethylene, 1,2:7,8-dibenzoxanthilium chloride, 2-hydroxy-1-naphthylethynylpyrylium salt, 5,6-benzocoumarin, bis(2-methyl-3-indolyl)(2-oxy-1-naphthyl)methane, 4,5-benzindoxazene, 2-acetoxy-1-naphthonitrile, 4-methoxy-1-naphthoaldehyde, 1,4-bis(4-methoxy-1-naphtyl)-1,3-butadiene, 2-naphthalene-2'-indoleindigo, 3-acetyl-6,7-benzocoumarine, 4-chloro1-oxy-2-naphthoaldehyde, naphthalenedialdehyde, 5-oxy-2-naphthalene-indole-indigo, 5,6,7,8-tetrahydro-2-naphthoaldehyde, imide chloride, naphthoamide, naphthoanilide, naphthonitrile, β-naphthoimide acid ethyl ester, β-naphthamidine, α-naphthoamidoxim, α-naphthohydrazide, naphthostyryl, oxynapthonitrile, 1,2:7,8-dibenzoxanthone, 1,2-benzoxanthone, 1,1'-binaphthylene-2,8':8,2'-dioxide, 2,3:6,7-dibenzoxanthone, 3-oxy-2-naphthoanilide, 1,3-bis(3-oxy-2-naphthoyloxy)benzene, 2,4-dioxyphenyl-3-oxy-2-naphthylketone, 4-arylazo-3-oxy-2-naphthoanilide, 3,4-dihydronaphthalene-1,2-dicrboxylic acid anhydride, 2-aminonaphthalimide, naphthalohydrazide, α-pyridonaphthalon, and N-methylnapthalimide; and acetonaphthenes and benzoylnaphthlanes such as 1,2:5,6-dibenzanthracene, 2'-methyl-2,1'-dinaphthylketone, 2-methyl-1,1'-dinaphthylketone, styryl-2-naphthylketone, β-naphthoylacetone, β-naphtoylacetophenone, 1-(β-naphthyl)-1-chloroethylene, 2-[tris(β-cyanoethyl)acetyl]naphthalene, 1,3,5-tri(β-naphthyl)benzene, dimethyl-2-naphthylcarbinol, 4,5:4',5'-dibenzothioindigo, styryl-1-naphthylketone, β-acetonaphthone, 1-propyonylnaphthalene, 1-butylnaphthalene, 1-isobutylnaphthalene, 1-stearoylnaphthalene, 1-benzoylnaphthalene, 1-o-toluylnaphthalene, p-biphenyl-1-naphthylketone, 1,2,5,6-dibenzanthracene, 1-acetyl-3,4-dihydronaphthalene, 1-acetyl-7-bromonaphthalene, 1-aminoacetylnaphthalene, 2-aminobenzoylnaphthalene, 1-acetyl-2-oxynaphthalene, 1-acetyl-2-methoxynaphthalene, 1-acetyl-4-ethoxynaphthalene, 2-cinnamoyl-1-naphthol, 7,8-benzochromone, 3-acetyl-2-methyl-7,8-benzochromone, 3,4-dimethyl-7,8-benzocoumarine, 4-methyl-3-phenyl-7,8-benzocoumarine, 1-benzoyl-2-oxynaphthalene, 4-oxybenzanthrone, 4-benzoyl-1-naphthol, 3-oxy-1,2-benzofluorenone, 2-acetyl-4-chloro-1-oxynaphthalene, α-naphthylglyoxal, β-naphthylglyoxal, 1,4-dibenzoylnaphthalene, and phenyl-4-methyl-1-naphthyldiketone.

Examples of polynuclear aromatic compounds include:

anthracenes and derivatives thereof such as anthracene, 1,2-dihydroanthracene, 1-chloroanthracene, 1,4-dichloroanthracene, 1,2,7-trichloroanthracene, 1,2,3,4-tetrachloroanthracene, 1-nitroanthracene, 9,10-dinitroanthracene, 1-aminoanthracene, 2-dimethylaminoanthracene, 2-anilinoanthracene, 9-methylaminoanthacene, 1,4-diaminoanthracene, 1-oxyanthracene, 9,10-dihydroanthrol, 10-methylanthranol, 10-phenylanthranol, 10-nitroanthranol, 2-amino-1-anthranol, 1,2-dioxyanthracene, 9,10-dioxyanthracene diacetate, 1-methylanthracene, 4-chloro-1-methylanthracene, 1,5-dichloro-2-methylanthracene, 9-ethylanthracene, 9-vinylanthracene, 9-propylanthacene, 9-isoporpylanthracene, 9-butylanthracene, 9-isobutylanthracene, 9-isoamylanthracene, 1,3-dimethylanthracene, 9,10-diethylanthracene, 1-phenylanthracene, 9-phenylanthracene, 1,5-dichloro-9-phenylanthracene, 10-nitro-9-phenylanthracene, 9-benzylanthracene, 1-benzhydrylanthracene, 9,10-diphenylanthracene, 9,10-dibenzylanthracene, 9,10-diphenyl-9,10-dihydroanthracene, 1-(β-naphthyl)anthracene, 9-(α-naphthyl)-10-phenylanthracene, 9,10-di(α-naphthyl)anthracene, 1,1'-bianthryl, 2,2'-bianthryl, 9,9'-bianthryl, anthracene-9-aldehyde, 1-acetylanthracene, 9-benzoylanthracene, 10-nitroanthraphenone, 9,10-dibenzoylanthracene, anthrone, 9-mercaptoanthracene, 9,10-disodium-9,10-dihydroanthracene, 10-bromo-9-anthryl magnesium bromide, anthrylmercury chloride and the like;

phenanthrenes and derivatives thereof such as phenanthrene, 9,10-dihydrophenanthrene, 1,2,3,4-tetrahydrophenanthrene, 1-chlorophenanthrene, phenanthrene-9,10-dichloride, 1-bromophenanthrene, 1-iodophenanthrene, 9-(chloromethyl)phenanthrene, 1-(bromomethyl)phenanthrene, 4,5-bis(bromomethyl)phenanthrene, 1-nitrophenanthrene, 10-bromo-9-nitrophenanthrene, 1-aminophenanthrene, 9,10-diaminophenanthrene, 9,9'-azoxyphenanthrene, 9,9'-azophenanthrene, 1-oxyphenanthrene, chloresterol, estrone, androsterone, 10-bromo-9-phenathrol, 9-nitro-3-phenanthrol, 4-amino-1-phenanthrol, 10-benzoazo-9-phenanthrol, 1,2-dihydroxyphenanthrene, retene-3,8-diol, 2,3,5,8-tetrahydroxyphenanthrene, 1-methylphenanthrene, 1-ethylphenanthrene, 1-vinylphenanthrene, 1,2-dimethylphenanthrene, 9,10-diethylphenanthrene, 9,10-dipropylphenanthrene, 2-ethyl-1-methylphenanthrene, 7-isopropyl-1-methylphenanthrene, 9,10-dihydroretene, aminoretene, 3-acetoaminoretene, 6-acylaminoretene, 9-phenylphenanthrene, 9-benzylphenanthrene, 1-(α-naphthyl)phenanthrene, 1,1'-biphenanthryl, 9,9'-biphenanthryl, 1-phenantrladehyde, 2-phanenthraldehyde, 9-phenanthraldehyde, 1-acetylphenanthrene, 2-propyonylphenanthrene, 3-acetylretene, and 1-benzoylphenanthrene;

phenanthrenequinones such as phenanthrene-1,2-quinone, phenanthrene-1,4'-quinone, phenanthrene-3,4-quinone, phenanthrene-9,10-quinone, 2-phenyl-3-acetoxy-4,5-biphenylfuran, 7-isopropyl-1-methylphenathrenequinone, 1-chlorophenanthrenequinone, 2-bromophenanthrenequinone, 2-iodophenanthrenequinone, 2,7- dibromophenanthrenequinone, 2-nitrophenanthrenequinone, 2,5-dinitrophenanthrenequinone, 2-aminophenanthrenequinone, 2,7-diaminophenanthrenequinone, 3,6-diaminophenanthrenequinone, 2,5-diaminophenanthrenequinone, 2-oxyphenanthrene-1,4-quinone, 3-oxyphenanthrenequinone, 2-oxyretenequinone, 3-oxyretenequinone, 6-oxyretenequinone, 2-oxy-3,4-dinitrophenanthrenequinone, and 2-amino-3-oxyphenanthrenequinone; and polynuclear aromatic compounds and derivatives thereof such as pentacene, hexacene, benzophenanthrene, benzo[a]anthracene, naphtho[2,1,a]pyrene, dibenz[a,j]anthracene, pyrene, coronene, 1,12-benzoperylene, ovalene, dibenzanthracene, naphthacene, teramycin, aureomycin, rubrene, o-toluoyl-1-naphthalene, benzanthraquinone, 5,6-dioxy-5,6-dihydrobenzzoanthracene, chrysene, triphenylene, dibenznaphthacene, hexahydropyrene, perylene, 3,9-dichloroperylene, tetrachloroperylene, 3,9-dibromoperylene, 3,10-dinitroperylene, 4,6-dibenzoyl-1,3-dimethylbenzene, 3,10-dinitroperylene, 4,6-dibenzoyl-1,3-dimethylbenzene, 6,13-dihydropentacene, naphtho[2,3-a]anthracene, dispiran, dibenz[a,h]anthracene, picene, picyleneketone, picene-5,6-quinone, dibenzo[c,g]phenanthrene, benzo[a]pyrene, benzo[a]pyrene-1,6-quinone, mesobenzanthronepericarboxylic acid anhydride, anthraceno[2,1-a] anthracene, dibenz[a,1]naphthacene, phenanthrene [2,3-a] anthracene, naphtho [2,3-a] pyrene, dibenzo[a,h]pyrene, dibenzo[a,1]pyrene, cedrene, anthanthrene, benzo[1,12]perylene, heptcene, tetrabenz[a,c,h,j]anthracene, tribenzo[a,i,l]pyrene, tetrahydrodimethyldinephthyl, mesonaphthodianthrene, mesoanthrodianthrene, 2,3:8,9-dibenzocoronene, and pyranthrene.

Examples of quinones and derivatives thereof include:

benzoquinones and derivatives thereof such as dibenzoquinoyldisulfide, 2,5-bis[phenylthio]-β-benzoquinone, bibenzoquinone, bitoluquinone, phoenicin, oosporein, indophenol, indoaniline, Hydron Blue, indamine, Melddola's Blue. Wurster's blue, Wurster's red, 4,4'-diphenoquinone, 4,4'-stilbenequinone, 3,5,3',5'-tetramethyl-4,4'-diphenoquinone, 3,5,3',5'-tetra-tert-butyl-4,4'-diphenoquinone, 3,5,3',5'-tetramethyl-4,4'-stilbenequinone, and 3,5,3',5'-tetra-tert-butyl-4,4'-stilbenequinone;

naphthoquinones and their derivatives such as 1,2-naphthoquinone, 3-oxy-2,2'-binaphthyl-1,4;3',4'-diquinone, 5,6-benzoquinoxaline, 1,2-benzophenazine, 2-benzoazo-1-naphthol, 4-(2,4-dioxyphenyl)-1,2-dioxynaphthalene, 4-{3,4,5-trioxyphenyl)-1,2-dioxynaphthalene, 1,2-naphthoquinone-1-phenylimide, 1,2-benzophenoxazine, 1,2-naphthoquinone-2-chloroimide, 1,2-naphthoquinone-bis-chloroimide, 2-anilino-1,4-napthhoquinone-4-anyl, 2-oxy-1,4-naphthoquinone-4-anyl, 1,2-naphthoquinone-1-oxime benzoate, 1,2-naphthoquinone-1-oxime methyl ether, 1-nitroso-2-naphthol, 2-nitroso-1-naphthol, naphtho[1',2';3,4]furazane, 1,2-naphthoquinone-2-oxime benzoate, 1,2-naphthoquinone-2-oxime methyl ether, 3-anilino-1,2;8,9-dibenzophenazine, naphthyl blue, naphthyl violet, 1,2;5,6-dibenzophenazine, naphtho [1',2';3,4]furazane-2-oxide, triphthaloylbenzene, hexaoxynaphthalene anhydride, 2,2'-binaphthyl-1,4;1',4'-diquinone, 1',4'-dioxynaphtho(2'3';3,4)pyrazole, 4,7-dioxy-3,3-diphenyl-5,6-benzindiazene, 2-diphenylmethyl-1,4-naphthoquinone, methylnaphtho[2',3';4,5]triazole-1',4'-quinone, 1,2,4-triacetoxynaphthalene, 1,4-naphthoquinonephenylimide, 1,4-naphthoquinone-mono-(p-dimethylaminoanil), 1,4-naphthoquinonealkylimide, 4-nitroso-1-naphthol, phenylcarbamate, 4-nitroso-1-naphthylamine, 4-benzhydryl-1,2-naphthoquinone, 2-benzhydryl-1,4-naphthoquinone, 3-benzhydryl, 2-methyl-1,4-naphthoquinone, 3-geranyl-2-methyl-1,4-naphthoquinone, 3-farnesyl-2-methyl-1,4-naphthoquinone, 2-methyl-3-phytyl-1,4-naphthoquinone, vitamin $K_1$, vitamin $K_2$, 3-allyl-2,6-dimethyl-1,4-naphthoquinone, 2,6-dimethyl-3-phytyl-1,4-naphthoquinone, 2,3-diallyl-6;7-dimethyl-1,4-naphthoquinone, 2-phenyl-1,4-naphthoquinone, 2-methyl-1,4-naphthoquinone, 2,6-dimethyl-3-phenyl-1,4-naphthoquinone, 3-benzyl-2-methyl-1,4-naphthoquinone, 2-methyl-3-(β-phenylethyl)-1,4-naphthoquinone, 3-cinnamyl-2-methyl-1,4-naphthoquinone, 2-benzhydryl-1,4-naphthoquinone, 4,7-diketo-8-diphenylmethyl-4,7,8,9-tetrahydro-5,6-benzindiazene, 2-methyl-3-diphenylmethyl-1,4-naphthoquinone, 2,3-diphenyl-1-naphthol, naphtho [2'.3';3,4]-pyrazole-1',4'-quinone, 3,4-dichloro-1,2-benzophenazine, 2-iodo-1,4-naphthoquinone, 1,4,5,8-tetraoxy-2,3;6,7-dibenzothianthrene, 5,8-dioxy-2,3;6,7-dibenzothianthrene-1,4-quinone, 2,3-diphenoxy-1,4-naphthoquinone, dinaphtho[2'.3';2,3][1",2":5,4]furan-1',4'-quinone, 2,3,5,8-tetrachloro-1,4-naphthoquinone, N,N'-bis-(1,4-naphthoquinon-2-yl)-benzidine, 2-anilino-1,4-naphthoquinon-4-anil, 4-anilino-1,2-naphthoquinone-2-anil, 4-(p-dimethylaminoanil)2-anilino-1,4-naphthoquinonedianil, phenylsorindaline, 2-anilino-1,4-naphthoquinonedianil, 2-anilino-3-phenyl-1,4-naphthoquinone, 2-anilino-3-bromo-1,4-naphthoquinone, 2-anilino-4-chloro-1,4-naphthoquinone, 2,3-dianilino-1,4-naphthoquinone, 2,3-dianilino-1,4-naphthoquinonedianil, nitrosoaminonaphthoquinone, 3-chloro-2-phenylnitrosoamino-1,4-naphthoquinone, phenyl-bis-(3-anilino-1,4-naphthoquinon-2-yl)-amine, 3-chloro-2-(p-tolylnitrosoamino)-1,4-naphthoquinone, 2,7-dioxy-1-nitrosonaphthalene, 4-benzoazo-1,3-dioxynaphthalene, di(3-oxy-1,4-napthoquinonyl-2) methane, anhydroalkannin, diquinoxalino[2',3':1,2:2", 3":3,4]naphthalene, and 3,.4-phthaloylfurazane; and anthraquinones and derivatives thereof such as 1,2-anthraquinone, 2,3-anthraquinone, 1,4-anthraquinone, 9,10-anthraquinone, 1,5-anthraquinone, 2,6-anthraquinone, 1,10-anthraquinone, 9,9-bis(p-oxyphenyl)anthrone, anthraquinonebisdiphenylmethide, bisphenylhydrazone, benzanthrone, anthrahydroquinone, β-ethylanthraquinone, 1,3,5,7-tetramethylanthraquinone, 2,2'-dianthraquinonylethane, 2,2'-dianthraquinonylethylene, 1,2,3-trioxyanthraquinone, anthrachrysone, enteroxyanthraquinone, alizalin, quinizalin, anthrarufin, chrysazin, histazalin, anthraflavin, isoanthraflavin, anthragallol, purpurin, oxyanthrarufin, anthrapurpurin, oxychrisazine, oxyflavopurpurin, rufiopin, quinalizarin, alizarinepentacyanin, rufigallol, Anthracene Blue WR, alizarinhexacyanin, 2-chloroquinizarin, 1-nitroanthraquinone, purpurin, 2,4,6,8-tetrabromoanthrachrysone, 3-aminoanthrapurpurin, 1,8-dinitroanthraquinone, α-aminoanthraquinone, 1,1'-dianthraquinonyl, dianthraquinoneimide, 1,4-dimethylaminoanthraquinone, 5-amino-1-nitro-6,8-dibromoanthraquinone, 1,5-tetramethyldiamino-4,8-dinitroanthraquinone, anthraquinoneacridone, bis-N-(2-oxyanthraquinolyl)-β-phenylenediamine, leucoquinizarin, Quinizarin Green, 1-amino-2,4-dibromoanthraquinone, 1,4-diacylaminoanthraquinone, anthraquinone-β-aldehyde, o-diazine, 6,7-phthaloyl-1,9-benzanthrone, oxynitrosoanthraquinone, 1,1'-diantraquinonyl, azoxyanthraquinone, 8-chloropyrazoleanthrone, 2,6-dihydrazinoanthraquinone, anthraquinone diazonium salt, β-anthraquinonehydrazine, azoxyanthraquinone, 1-hydroxylaminoanthraquinone, 1,5-dihydroxylaminoanthraquinone, 1-nitrosoanthraquinone, 1-hydrazinoanthraquinone, 1,5-dihydrzinoanthraquinone, 1-azidoanthraquinone, 2-azidoanthraquinone, anthraquinonemethylsufoxide, 1,4-dirhodananthraquinone, β,β-dianthraquinonylsulfide, anthraquinonesulfenyl chloride, 2,2'-dianthraquinonyl, 1,1'-dianthaquinonyl, helianthrone, mesobenzodianthrone, 2,2'-diamino-1,1'-dianthraquinonyl, flavanthrone, 2,2'-dianthryl, mesonaphthodianthrone, 1,1'-dianthraquinonylamine, quinizarinquinone, histazalinequinone, arizalinequinone, 6-oxyquinizarinquinone, and the like.

Examples of nonbenzenoid aromatic compounds include azulene, cyclodecapentane, cyclotetradecaheptane, cyclooctadecanonaene, cyclotetracosadodecaene, heptalene, fulvalene, sesquifulvalene, heptafluvalene, perinaphthene, indeno[2,1-a]perinaphthene, dibenzo[bf]oxepine, dibenzo[bf]thiepin, indolizine, cyclo[3,2,2]azine, 4,5-benzotropolone, 3,4-benzotropolone, 5H-benzocycloheptene, 7H-cycloheptene, colchicine, colchiceine, colchinol methyl ether, ditropyl ether, ditropyl ether, ditropyl sulfide, cyclopentadienyltropilidene, Benzo Azurine, carbinol, pseuvon[0045], 4,5-benzotropone, 2-phenyltropone, naphthocyclobutadiene, naphthotropone, tribenzotropone, 1-amino-1,3-dicyanazulene, benzoylhydrazone, 3-phenyl-1-oxazulanone-2,2-benzyltropone, 3-methyl-2-phenyltropone, 2,7-diphenyltropone, 2-(α-naphthy)-tropone, 2,7-tetramethylene-4,5-benzotropone, 2,7-diphenyl-4,5-benzotropone, naphtho[2',3'-4,5]tropone, naphtho[2',1'-2,3]tropone, dibenzosuberane, naphtho[1',2'-2,3]tropone, dibenzosuberol, 4-oxy-2-phenyltropone, 4,5,7-tribromo-2-phenyltropone, 3,5'-ditropone, 3-(p-methoxyphenyl)tropone, 4-oxy-2-phenyltropone, 3-(α-naphthyl)tropone, 3,4-diphenyltropone, 3,7-dibenzyltropone, 4-(γ-phenylpropyl)tropone, 3,5'-bitroponyl, 4-(p-nitropstyryl)tropone methyl ether, 2-amino-1,3-dicanazulene, benzo[b]tropothiazine, 5-bromo-2-phenyltropone, 4-bromo-2,7-diphenyltropone, diphenylbiphenylcarbinol, thiazinotropone, and teh like.

Next, heterocyclic compounds having five or more conjugated π bonds are mentioned below.

Examples of oxygen-containing heterocyclic compounds include:

furan and derivatives thereof such as 2,5-diphenylfuran, 2-phenylfuran, 3-methyl-diphenylfuran, lepidene, pyridoxine, and 2,4-diphenylfuran;

benzofuran, isobenzofuran, dibenzofuran and derivatives thereof such as dibenzofuran, fulano[2',3'-7,8]flavon, egonol, Euparin, 1,3-diphenylisobenzofuran, tetraphenylglycol, tetraphenylphthalan, 9-phenylanthracene, o-oxymethyltriphenylcarbinol, 3,3'-diphenylphthalide, 1-phenylphthalan, 1,1-phenylphthalan, 3,3-diphenylphthalide, rubrene, α-sorinine, dibenzofuran, 2,2'-dihydroxybiphenyl, 2,2'-diaminobiphenyl, phenazone, dibenzoquinone, 2-hydroxybenzofuran, 2-methylbenzofuran, benzo[a]benzofran, benzo[b]benzofuran, dibenzo [a,f] dibenzofuran, dibenzo[c,d]dibenzofuran, dibenzo[c,e] dibenzofuran, bi(2-dibneofuryl], and bi(3-dibenzofuryl);

pyran and pyron derivatives such as 2-β-oxyphenyl-4,6-diphenylpyrylium ferrichloride, anhydrobase, benzopyran, 4-β-oxyphenyl-2,6-diphenylpyrylium ferrichloride, and 6-phenylcoumarin;

chromenol and chromene derivatives such as 6-methyl-2,3-diphenylchromon, 6-methyl-2,3-diphenyl-4-(p-tolyl)-1,4-benzopyran-4-ol, chromanol, γ-chromene, oxycoumarone, chromene, cyanizine chloride, fisetin, 6-oxy-3-methoxy-5,7-dimethylflavylium chloride, 4,4'-diflavylene-3,3'-oxide, chrysinidine, apigenidin, rotoflavinidine, luterinidine, galanginidine, fisenidin, maurinidine, flavoneimide, pelargonidine, cyanidine, delphinidine, petunidine, syringidine, hirsutidine, apigeninidine, carajurine, racorhodine, and dracorubine;

flavon, flavonol and isoflavon derivatives such as flavonol, flavon, and fukugetin;

coumarin and isocoumarin derivatives such as 7-oxy-3,4-benzocoumarin, dicoumarol, angelicin, psoralen, bergapten, bergaptol, xanthotoxin, xanthotoxal, isopimpinellin, oroselol, oroselon, peucedanin, oxyperucedanin, ostruthol, medakenine, nodakenetin, seselin, xanthyletin, and xantholetin; and xanthone and related compounds such as dixanthylene, 9-phenylxanthene, isoxanthone, 1,2,7,8-dibenzoxanthene, 3,9-diphenylxanthene, and 9,9-diphenylxanthene.

Examples of nitrogen-containing heterocyclic compounds include:

pyrroles such as 1-phenylpyrrole, 5-phenylpyrrole-2-aldehyde, phenyl-2-pyrylketoneoxime, 2-phenylpyrrole, 2-methyl-1-phenylpyrrole, 2-methyl-4-phenylpyrrole, 2-methyl-5-phenyl pyrrole, 3-methyl-5-phenylpyrrole, 2,4-diphenylpyrrole, 2,5-diphenylpyrrole, 2,3-diphenylpyrrole, 2,3,5-triphenylpyrrole, 1,2,3,5-tetraphenylpyrrole, 2,3,4,5-tetraphenylpyrrole, diphenyl-2-pyrylpyrylcarbinol, pyrrolecyclomethine dye, pyrrolepolymethine dye, biliverdin, bilirubin, prodigiosin, and stercobilin;

indoles such as 5,7-dichloro-2-phenylindole, 7-chloro-2-phenylindole, 5,7-dibromo-2-phenylindole, 7-bromo-5-chloro-2-phenylindole, 2-(3'-indolyl)-3-isonitosoindolenine, Rose Indole, Tryptophane Blue, Indolo[3,2-c]quinoline, indolo[1,2-c]quinazoline, 2-phenyliundole, 3-nitro-2-phenylindole, 3-phenylindole, N-methyl-3-phenylindole, 3-(o-nitrophenyl)indole, 2,3-diphenylindole, 3-triphenylmethylindole, 2-methyl-3-triphenylmethylindole, 2-phenyl-3-triphenylmethylindole, 2-(1-naphtyl)-3-triphenylmethylindole, 3,3'-diindole, 3,2'-diindolyl, 3,3'-dehydrodiindole, 3-nitroso-2-phenylindole, 3-nitro-2-phenylindole, 2-methyl-3-phenylazoindole, 2-phenyl-3-phenylazoindole, 6-oxy-3-phenylindole, tryptophan, 4,5-benzotriptophan, 6,7-benzotriptophan, 2-(2-naphthyl)-23-trihenylmethylindole, and violasein;

oxo derivatives of indole such as 3-(4-ethoxy-1-naphthyl) oxyindole, indophenine, indigoazine, and Indigo Yellow 3G;

isoindoles such as 1-chloro-4-methylphthalazine, 1-benzylidenephthalimidine, 2-methyl-3-phenylphthalimidine, 2-methyl-1,3-diphenylisoindole, 2,5-diphenylisoindole, β-isoindigo, and dimethylimino-β-isoindigo;

carbazoles such as 1-phenyl-1,2,3-benzotriazole, 2,2'-diaminodiphenyl, and 1,1'-dicarbazole;

porphyrins such as porphyrazine, magnesium octamethyltetraazporphyrin, azabipyromethine, phthalocyanine, diazacoproprophyrin, porphine, mesotetraphenylporphyrin, chlorophyll-b, and chlorophyll-a;

oxazoles such as 2-phenyloxazole, 4-phenyloxazole, 5-phenyloxazole, 2-methyl-4-phenyloxazole, 2-methyl-5-phenyloxazole, 4-methyl-2-phenyloxazole, 5-methyl-2-phenyloxazole, 4,5-dimethyl-2-phenyloxazole, 2,4-diphenyloxazole, 2,5-diphenyloxazole, 4,5-diphenyloxazole, 2-methyl-4,5-diphenyloxazole, 2,4,5-triphenyloxazole, 2-(o-nitrophenyl)oxazole, 2-(p-nitrophenyl)oxazole, 2-amino-5-phenyloxazole, 2-(p-nitrophenyl)oxazole, 2-amino-5-phenyloxazole, 2-(p-aminophenyl)oxazole, 2-(o-aminophenyl)oxazole, 4,5-dimethyl-2-phenyloxidoxazole, 4-methyl-2,5-diphenyloxiodoxazole, 2,4,5-triphenyloxidoxazole, 4-(o-methoxycarbonylbenzal)-2-phenyl-5-oxazolone, oxacarboxcyanine dye, and phenanthroxazole;

isoxazoles such as 4-nitro-3-phenylisoxazole, 5-amino-3-methyl-4-phenylisoxazole, and 5-benzoyl-3,4-diphenylisoxazole;

thiazoles such as 4-phenylthiazole, 5-phenylthiazole, 5-(p-fluorophenyl)thiazole, 2-methyl-4-phenylthiazole, 4-methyl-5-phenylthiazole, 5-methyl-4-phenylthiazole, 4,5-diphenylthiazole, 2-methyl-4,5-diphenylthiazole, 1,4-bis(4-methyl-2-thiazolyl)benzene, p,p'-bis(4-methyl-2-thiazolyl)biphenyl, 2-amino-4-phenylthiazole, 2-amino-5-phenylthiazole, 2-amino-4,5-diphenylthiazole, 2-phenylazothiazole, 2-amino-4-methyl-5-phenylazothiazole, 4-methyl-2-phenylazothiazole, α-naphthothiazole, β-naphthothiazole, naphtho[2,3]thiazole, naphtho[1,2]thiazole, 2-methyl[1,2]thiazole, 2-phenylnaphtho[1,2]thiazole, 2-methylnaphtho[2,1]thiazole, 4-bromo-2-phenylnaphtho[2,3]thiazole, 2-oxynaphtho[2,1]thiazole, 2aminonaphtho[1,2]thiazole, 2-aminonaphtho[1,2]thiazole, 2-mercapto[1,2]thiazole, and 2-mercapto[2,1]thiazole;

imidazoles such as 2-phenylimidazole, 4-phenylimidazole, 4-methyl-2-phenylimidzole, 2,4-diphenylimidazole, 4,5-diphenylimidazole, 2,4,5-triphenylimidazole, 2-bromo-4-phenylimidazole, 5-chloro-1-ethyl-2-phenylimidazole, 5-chloro-1,2-diphenylimidazole, 2-phenylazoimidazole, 2-methyl-4-phenylazoimidazole, and 2-(o-aminophenyl)benzimidazole;

pyrazoles such as 3-phenylpyrazole, 5-phenylpyrazole, 4-phenylpyrazole, 1-methyl-3-phenylpyrazole, 1-methyl-5-phenylpyrazole, 3-methyl-5-phenylpyrazole, 1,3-diphenylpyrazole, 1,5-diphenylpyrazole, 1,3,4-triphenylpyrazole, 1,3,5-triphenylpyrazole, 1,4,5-triphenylpyrazole, 5-amino-3-phenylpyrazole, 3-amino-5-phenylpyrazole, 5-methyl-1,3-diphenylpyrazole-4-aldehyde, 3,5-diacetyl-4-phenylpyrazole, and 4-benzoyl-1,5-diphenylpyrazole;

oxadiazoles such as 3-phenylfurazane, 3,4-diphenylfurazane, naphtho[1,2]furazane, phenylfuroxane, 3-methyl-5-phenyl-1,2,4-oxadiazole, and 2,5'-diphenyl-1,3,4-oxadiazole;

thiadiazoles such as 5-phenyl-1,2,3-thiadiazole, 2-oxy-5-phenyl-1,3,4-thiadiazole, 2-methylsulfonyl-5-phenyl-1,3,4-thiadiazole, 2-phenyl-1,3,4-thiadiazole, and 5,5'-diphenyl-2,2'-bis(1,3,4-thiadiazole);

triazoles such as 2-phenyl-1,2,3-triazole, and 5-(p-aminophenyl-3-mercapto-1,2,4-traizole;

tetrazoles such as 5-phenyltetrazole, 1,5-diphenyltetrazole, 1-oxy-5-phenyltetrazole, and 1-amino-5-phenyltetrazole;

pyridine and related compounds such as 2-phenylpyridine, 2,2'-dipiridyl, 2-chloro-6-phenylpyridine, 2,6-dichloro-3-phenylpyridine, 2,2'-azopyridine, 3,3'-azopyridine, benzene-4-azopyridine, 5-chloro-2,2'-azopyridine, 5,5'-dichloro-2,2'-azopyridine, 4-pyridylazoresorcin, 4-pyridyl-m-phenylenediamine, and 3-pyridyl-m-phenylenediamine;

quinoline and related compounds such as quinoline, quinaldine, quinaldine-N-oxide, ethylquinaline, 2-phenylquinaline, 3-methylquinaline, 3-phenylquinaline, 4-methylquinaline, 4-phenylquinoline, 6-methylquinoline, 6-ethylquinoline, 6-phenylquinoline, 2,4-dimethylquinoline, 2,4-diphenylquinoline, quinoline-4-methanol, quinoline[6,5-f]quinoline, quinophthalone, flavaaniline, Quinline Blue, Ethyl Red, pinacyanol, naphthocyanol, cryptocyanine, xenocyanine, azacyanine, 6,6'-octahydroquinoline, Vestrun Red, 2,3'-biquinoline, 2,5'-biquinoline, 2,6'-biquinoline, 2,7'-biquinoline, 3,3'-biquinoline, 4,5'-biquinoline, 4,6'-biquinoline, 5,5'-biquinoline, 6,6'-biquinoline, 6,7'-biquinoline, 6,8'-biquinoline, 7,7'-biquinoline, 8,8'-biquinoline, 2-fluoroquinoline, 3-fluoroquinoline, 4-fluoroquinoline, 5-fluoroquinoline, 6-fluoroquinoline, 7-fluoroquinoline, 8-fluoroquinoline, 3-bromoquinoline, 4-chloroqunoline, 2,4-dichloroquinoline, 3-nitroquinoline, 4-nitroquinoline, 2,3-quinolindiol, quinoline-2-thiole, 2-oxyquinoline-3-thiole, 2-aminoquinoline, 8-aminoquinoline, 2-hydradiquinoline, pyrroloquinoline, thiazoloquinoline, pyrimido[4,5-b]quinoline, and benzo[f]quinoline;

isoquinoline and related compounds such as 1-methylisoquinoline, 3-bromomethyl isoquinoline, 1-phenylisoquinoline, 4-phenylisoquinoline, 1,1'-biisoquinoline, 5,5'-biisoquinoline, 1-chloroisoquinoline, 5-iodoisoquinoline, 5-bromoisoquinoline, 5-nitroisoquinoline, isoquinoline-1,3-diol, 6,7-methylenedioxyisoquinoline, 1-aminoisoquinoline, 1-cyanoisoquinoline, 1-phenylbenzo[g]-3,4-dihydroisoquinoline, and 3-(p-aminophenyl)-5,8-dihydro-8,9-dimethoxyimidazo[5,1-a]isoquinoline;

acridine and related compounds such as acridine, 1-methylacridine, 9-phenylacridine, 9-(3-pyridinyl)acridine, 2-chloroacridine, 2-bromoacridine, 2-acridinol, acridin-3,6-diol, 4-methoxyacridine, 9-phenoxyacridine, 1-nitroacridine, 4-aminoacridine, 1-aminoacridine, 9-phenylaminoacridine, 9-oxyacridine, crysaniline, acriflavine, 3,6-diamino-4,5-dimethylacridine, and acrinol;

phenanthridines such as 3,4-benzoquinoline, 6-methylphthanthridine, 6-aminomethylphthanthridine, 6-phenylphthanthridine, 6-chloroaphthanthridine, 6-bromophthanthridine, 6-nitrophthanthridine, 1-aminophthanthridine, and 3-oxyphthanthridine;

anthrazolines such as pyrido[2,3-g]quinoline, 2,7-diphenyl[2,3-g]quinoline, and 2,8-diphenylpyrido[3,2-g]quinoline.

phenanthroline and related compounds such as 1,7-phenanthroline, 1,10-phenanthroline, 4,7-phenanthroline, 8-methyl-1,7-phenanthroline, 4,10-dioxy-1,7-phenanthroline, 3,5-dichloro-1,10-phenanthroline, 2-amino-1,10-phenanthroline, 5-oxy-4,7-phenanthroline, and 5-amino-4,7-phenanthroline;

pyridoindoles such as 1,9-pyridoindole, 2,9-pyridoindole, and 4,9-pyridoindole;

naphthyridine and related compounds such as 1,5-naphthyridine, 1,7-naphthyridine, 1,8-naphthyridine, 1,6-naphthyridine, 2,6-naphthyridine, 2,7-naphthyridine, 1,5-naphthyridin-4-ol, 3-amino-1,5-naphthyridine, 2-amino-1,5-naphthyridine, and 2-oxy-1,7-naphthyridine;

oxazine and related compounds such as phenoxazine, resazurin, gallocyanine, Nile Blue A, Meldola's Blue, and Brilliant Cresyl Blue;

thiazine and related compounds such as o-benzaminophenyl-β-phenoxycarbonylethylsulfide, phenothiazine, nitrophenothiazine, 3-chloro-10-ethylphenothiazine, 4-amino-4'-anilinodiphenyldisulfide, 2-chloro-10-(3-dimethylaminopropyl)phenothiazine, chloropromazine, 10-(2-dimethylamino-1-propyl) phenothiazine hydrochloride, 10-[2-(1-pyrrolidyl) ethyl]phenothiazine hydrochloride, 10-(1-methyl-3-piperidylmethyl)phenothiazine, 2-acetyl-10-(3-dimethylaminopropyl)phenothiazine, and Methylene Blue;

pyridazine and related compounds such as cinnoline, 3-methylcinnoline, 4-chlorocinnoline, 3-bromocinnoline, 4-cinnolinol, 4-aminocinnoline, phthalazine, 4-ethyl-2-phenylptharazinone, phtharazinethiol, 1(2H)-phtharadinone, 3-phenylpseudophtharazine, 4-methyl-3-phenylpseudophtharazone, and 2,3-dihydro-1,4-phthazindion;

pyrimidine and allied compounds such as 2-cinnamethylpyrimidine, 4,6-dimethyl-2-phenylpyrimidine, 2,4,6-triphenylpyrimidine, alloxantin, 2,6-dioxy-4-phenylpyrimidine, 4,6-dioxy-2-phenylpyrimidine, 5-chloro-4,6-dioxy-2-phenylpyrimidine, sulfaddiazine, sulfisomidine, tritolidylamine hydrochloride, vitamin $B_1$, thiochrome, cocarboxylate, allomycin, 6-(2-furfuryl)aminopurine, pteridine, 2,4-pterindiol, 2-amino-6-methyl-4-pteridinol, xanthopterin, leucopterin, isoxanthopterin, quinazoline, 4-chloroquinazoline, 2,4-dichloroquinazoline, 4-quinazoline, and 2,3-diphenyl-4-quinazoline;

pyrazine and allied compounds such as 3,6-diphenylpyrazinol, quinoxaline, 2,3-dimethylquinoxaline, 2-chloroquinoxaline, 2,3-dichloroquinoxaline, 2-methylquinoxaline, 2-(o-aminoaniline)quinoxaline, N,N'-diphenyl-2,3-pyperadion, 2-quinoxalinol, 2,3-quinoxalindiol, 2-aminoquinoxaline, 2,3-diaminoquinoxaline, methylquinoxaline-2-carboxylic acid ester, 2-(d-arabotetraoxybutyl)quinoxaline, flavazole, glucazidone, phenazine, phenazine-5,10-dioxide, 5-methylphenazinium methylsulfate, 10-methyl-5,10-dihydro-2-phenazinecarbonitrile, 2-phenazinecarbonitrile, 1-phenazinol, 1-methoxyphenazine, 2-phenazinol, 1,6-dioxyphenazine-5,10-dioxide, 1-aminophenazine, 2-aminophenazine, 2,3-diaminophenazine, Neutral Red, 5,10-dihydrophenazine, 5-methyl-5,10-dihydrophenazine, and 1,2,3,4-tetahydrophenazine; and tri and tetra-hetero six-membered ring compounds such as 2,4,6-triphenyl-S-triazine, 2,4-dichloro-6-o-chloroaniline-s-triazine, 5,6-diphenyl-as-triazine, 2,6-diphenyl-2,3,4,5-tetrahydro-as-triazine, 5,6-diphenyl-as-triazin-3-ol, 1,2,4-benzotriazine, 1,2,4-benzotriazin-3-ol, 3-phenyl-1,2,3-benzotriazin-4-(3H)-on, 1,2,3-benzotriazin-4-ol, 1,2,3-benzotriazine-4-thiol, 3-amino-1,2,3-benzotriazine, 2,3-diphenylosotetrazine, 5,6-dimethyl-2,3-diphenylosotetrazine, 5-cyano-2,3-diphenylosotetrazine, 5,6-diebnzoyl-2,3-diphenylosotetrazine, 2,3-dibenzoyl-5-methylosotetrazine, 2,3-dibenzoyl-5,6-dimethylosotetrazine, 2,3-dibenzoyl-5,6-diphenylosotetrazine, 2,3-bis(2,4-dichlorophenyl)-5,6-diphenyl-1,2,3,4-tetrahydro-v-tetrazine, 1,2,3,4-tetraethoxycarbonyl-5,5-diphenyl-1,2,3,4,5,6-hexahydro-v-tetrazine, 7-methyl-2-(4-methylphenyl)-1,2-dihydrobenzotetrazine, 3,6-diphenyl-1,2-dihydro-s-tetrazine, 1,3-diphenyl-1,4,5,6-tetrahydro-s-tetrazine, and 3,3,6,6-tetraphenyl-1,2,3,6-tetrahydro-s-tetrazine.

Examples of sulfur-containing heterocyclic compounds include: 2-phenylthiophene, 2,4-diphenylthiophene, 2,3,4,5-tetraphenylthiophene, methaphenilene hydrochloride, methapyrilene hydrochloride, chlorothene citrate, thenyldiamine hydrochloride, α-quinquethienyl, and α-sexitheinyl;

condensed thiophene compounds such as 3,3'-diiminothioindigo, indigolon, dihydronaphtho[2,1-b]thianaphthene, 1,3-diphenylisothianaphthene, dibenzothiophene, 2-nitrodibenzothiophene, aminodibenothiophene, 2,8-diaminodibenzothiophene, dibenzothiophene-5-dioxide, 4-oxydibenzothiophene, 2,8-dioxydibenzothiophene, 2-chlorodibenzothiopehene, 1-bromodibenzothiopehene, 2,8-dibromodibenzothiophene, 2-iododibenzothiophene, 2-acetyldibenzothiophene, 2,8-diacetyldibenzothiophene, naphthothiophene, 3-oxythiophanthene, 2,3-thioanthreaquinone, naphtho[2,3-c]thiophene, naphtho[1,2-b]thiophene, 1,2-naphtho[2,1-b]thiophenequinone, 1-oxy-2-naphtho[2,1-b]thiophenealdehyde, naphtho[1,2-c]thiophene, 2H-naphtho[1,8]thiophene, naphtho[2,1-b]thiophene, naptho[1,2-c]thiophene, benzo[b]thiophanthrene, 6,11-benzo[b]thiophanthraquinone, benzo[g]thiophanthrene, 4,5-benzothiophanthrene, and 8,9-benzothiophanthrene;

five-membered single ring compounds having two hetero-atoms such as 5-phenyl-1,2-dithiole-3-thion, 3,4-dihydronaphtho-2,1-trithion, thiaflavon, thiacoumarin, thiaxanthene, thiaxanthohydrol, thiaxanthone, MilacilD, and bisthiaxanthylene; and six-membered ring compounds having two or more hetero-atoms such as 2,5-diphenyl-1,4-dithiadiene, thiophenealdehyde, thianthrene, 2,7-dimethylthianthrene, 1-thianthrenyl lithium, 1-chlorothianthrene, phenoxthine, 2-vinylphenoxthine, 2-aminophenoxthine, 2-nitrophenoxthine, 3,7-dinitrophenoxthine, 10,10-dphenylhenoxthine, and 2,5-diphenylthiophene.

Example of other types of compounds include:

bicyclic compounds sharing nitrogen atom such as cinchonine, 2-phenylpicoline, 3-ethyl-2-phenylpicoline, 3-benzyl-2-phenylpicoline, 3-nitroso-2-phenylpicoline, 2:3-benzopicoline, 1,5,8-trimethyl-2:3-benzopicoline, 1-ethyl-3,5-dimethyl-2:3-benzopicoline,1,8-dimethyl-2:3-benzopicoline, 3-phenyl-7:8-bnezopicoline, cyclo[3.3.3]azine, cyclo [3.2.2]azine, 2-phenylcyclo[3.2.2]azine, 2,3-diphenylcyclo[3.2.2]azine, tricyclazine, 7-methylbenzo [1]quinolizinium bromide, benzo[b]quinolizinium salt, tetrahydro-Ψ-berberine, tetrahydroberbereine, laudanosoline, tetrahydro-2,3,9,10-tetraoxy-7-methyldibenzopyrrocolinium chloride, homolaudanozoline, octadehydromatrine, tetrahdyropalmatinemeto, iodide and canadine methiodide; and alkaloids such as nicotyrine, 3',2-dipyridyl, cusparine, galipoline, 1-methyl-2-quinolone, casimiloin, 2-pentylquinoline, 4-hydroxy-2-pentylquinoline, 4-methoxy-2-pentylquinoline, 1-methyl-2-pentyl-4-quinolone, 4-methoxy-2-phenylquinoline, 7-methoxy-1-methyl-2-phenyl-4-quinolone, cuspureine, dictamnine, skimmianine, evolitrine, maclurin, kokusagine, kokusaginine, maculosidine, flindersiamine, evoxoidine, evoxine, evolatin, acronylcidine, medicosmine, acronidine, γ-fagarine, cinconine, quninone, quinotoxin, N-bromoquinotoxin, dihydrocinchonicine, heteroquinine, evoxabtidine, xanthoquinoline, 1,3-dimethoxy-10-methylacridone, evoxanthine, xanthevodine, melicopine, melicopidine, melicopicine, acronycine, flindersine, papaverin, papaveraldine, laudanosine, laudanine, codamine, protopapaverine, armepavine, 4,4'-5-trimethoxy-2-vinylstilbene, coclaurine, d-isococlaurine, neprotine, corpaverine, phellodendrine, magnocurarine, coclanoline, narcotin, narcotoline, aponarceine, cinchonine, cinchotoxin, didehydrohydratine, bicuculline, adlumidine, corlumidine, cordrastine, magnolamine, berbamine, ρ-methylberbamine, and the like.

Some of these conjugated π-bond-bearing compounds serve as dyes and/or pigments and can be used as they are. Further, dyes and/or pigments, which are included or are not included in the category of the conjugated π-bond-bearing compounds, may further added to for use along with the above-mentioned π-bond-bearing compounds. For example, such dyes and pigments include: azo dyes and pigments such as monoazo and polyazo dyes and pigments, metal complex salt azo dyes and pigments, stilbene azo dyes, thiazole azo dyes, and the like; anthraquinone dyes and pigments such as anthraquinone derivatives, anthrone derivatives and the like; indigo dyes and pigments such as indigo derivatives, thio-indigo derivatives and the like; phthalocyanine dyes and pigments; carbonium dyes and pigments such as diphenylmethane dyes, triphenylmethane dyes and pigments, xanthene dyes, acridine dyes, and the like; quinoneimine dyes such as azine dyes, oxazine dyes, thiazine dyes, and the like; methine dyes such as polymethine and cyanine dyes; quinoline dyes; nitro dyes; benzoquinone and naphthoquinone dyes; naphthalimide dyes and pigments; perinone dyes; sulfide dyes; fluorescent dyes; azoic dyes; and reactive dyes. These may be used on their own or in combination.

Among these dyes and pigments, azine dyes are preferred. Specific examples of these dyes and pigments are mentioned below in terms of color index.

Examples of azo dyes and pigments include:

monoazo and polyazo dyes such as Basic Yellow 32, 34 or 36, Basic Orange 2, 32, 33 or 34, Basic Red 17, 18, 22, 23, 24, 32, 34, 38, 39 or 40, Basic Violet 26 or 28, Basic Blue 58, 59, 64,65, 66, 67 or 68, Basic Brown 1, 4, 11 or 12, Basic Black 8, Azoic Diazo Component 4, 21, 27 or 38, Disperse Yellow 3, 4, 5, 7, 8, 23, 50, 60, 64, 66, 71, 71, 76, 78 or 79, Disperse Orange 1, 3, 5, 13, 20, 21, 30, 32, 41, 43, 45, 46, 49, 50 or 51, Disperse Red 1, 5, 7, 12, 13, 17, 43, 52, 54, 56, 58, 60, 72, 73, 74, 75, 76, 80, 82, 84, 88, 89, 90, 97, 99, 101, 103, 113, 117, 122, 125, 126, 128 or 129, Disperse Violet 10, 24, 33, 38, 41, 43 or 96, Disperse Blue 85, 92, 94 or 106, Disperse Brown 3 or 5, Disperse Black 1, 2,10, 26, 27, 28, 29, 30 or 31, Solvent Yellow 2, 6, 14, 15, 16, 19, 21 or 56, Solvent Orange 1, 2, 5, 6, 14 or 45, Solvent Red 1, 3, 23, 24, 25, 27 or 30, Solvent Brown 3, 5 or 20, Solvent Black 3, Pigment Yellow 1, 2, 3, 4, 5, 6, 7, 10, 11, 12,13, 14, 15, 16, 17, 23, 65, 73 or 83, Pigment Orange 1, 2, 5, 13, 14, 15, 16, 17, 24 or 31, Pigment Red 1, 2, 3, 4, 5, 6, 7, 8, 9, 10, 11, 12,13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 112,114 or 163, Pigment Blue 25, Pigment Green 10, Pigment Brown 1 or 2, Pigment Black 1, Direct Yellow 1, 8, 11, 12, 24, 26, 27, 28, 33, 44, 50, 58, 85, 86, 87, 88, 89, 98, 100 or 110, Direct Orange 1, 6, 8, 10, 26, 29, 39, 41, 49, 51, 57, 102 or 107, Direct Red 1, 2, 4, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 or 231, Direct Violet 1, 7, 9, 12, 22, 35, 51, 63, 90, 94 or 98, Direct Blue 1, 2, 6, 8, 15, 22, 25, 71, 76, 77, 78, 80, 120, 123, 158, 160, 163, 165, 168, 192, 193, 194, 195, 196, 203, 207, 225, 236, 237, 246, 248 or 249, Direct Green 1, 6, 8, 28, 30, 31, 33, 37, 59, 63, 64 or 74, Direct Brown 1A, 2, 6, 25, 27, 44, 58, 59,101, 106, 173, 194, 195, 209, 210 or 211, Direct Black 17, 19, 22, 32, 38, 51, 56, 71, 74, 75, 77, 94, 105, 106, 107, 108, 112,113, 117, 118, 132, 133 or 146, Acid Yellow 11, 17, 19, 23, 25, 29, 36, 38, 40, 42, 44, 49, 61, 70, 722, 75, 76, 78, 79, 110, 127, 131, 135, 141, 142, 164 or 165, Acid Orange 1, 7, 8, 10, 19, 20, 24, 28, 33, 41, 43, 45, 51, 56, 63, 64, 65, 67 or 95, Acid Red 1, 6, 8, 9, 13, 14, 18, 26, 27, 32, 35, 37, 42, 57, 75, 77, 85, 88, 89, 97, 106, 111, 114, 115, 117, 118, 119, 129, 130, 131, 1333, 134, 138, 143, 145, 154, 155, 158, 168, 249, 252, 254, 257, 262, 265, 266, 274, 276, 282, 283 or 303, Acid Violet 7, 11, 97 or 106, Acid Blue 29, 60, 92, 113, 117 or 120, Acid Green 19,20 or 48, Acid Brown 2, 4, 13, 14, 20, 53, 92, 100, 101, 236, 247, 266, 268, 276, 277, 282, 289, 301 or 302, Acid Black 1, 7, 24, 26, 29, 31, 44, 76, 77, 94, 109 or 110, Mordant Yellow 1, 3, 5, 23, 26, 30, 38 or 59, Mordant Red 7, 9, 17, 19, 21, 26, 30, 63 or 89, Mordant Violet 5 or 44, Mordant Blue 7, 13, 44, 75 or 76, Mordant Green 11, 15, 17 or 47, Mordant Brown 1, 14, 15, 19, 21, 33, 38, 40, 52 or 87, Mordant Black 1, 3, 7, 9, 11, 17, 26, 32, 38, 43, 44, 51, 54, 65, 75, 77, 84, 85, 86 or 87, Food Yellow 3 or 4, and Food Red 7 or 9;

metal complex azo dyes such as Solvent Yellow 61 or 80, Solvent Orange 37, 40 or 44, Solvent Red 9, 21, 83, 84, 100, 109 or 121, Solvent Brown 37, Solvent Black 23, Acid Black 51, 52, 58, 60, 62, 63, 64, 67, 72, 107, 108, 112, 115, 118, 119, 121, 122, 123, 131, 132, 139, 140, 155, 156, 157, 158, 159 or 191, Acid Yellow 59, 98, 99, 111, 112, 114, 116, 118, 119, 128, 161, 162 or 163, Acid Orange 74, 80, 82, 85, 86, 87, 88, 122, 123 or 124, Acid Red 180, 183, 184, 186, 194, 198, 199, 209, 211, 215, 216, 217, 219, 256, 317, 318, 320, 321 or 322, Acid Violet 75 or 78, Acid Blue 151, 154, 158, 161, 166, 167, 168, 170, 171, 175, 184, 187, 192, 199, 229, 234 or 236, Acid Green 7, 12, 35, 43, 56, 57, 60, 61, 65, 73, 75, 76, 78 or 79, Acid Brown 19, 28, 30, 31, 39, 44, 45, 46, 48, 2324, 225, 226, 231, 256, 257, 294, 295, 296, 297, 299 or 300, Direct Yellow 39, Direct Violet 47 or 48, Direct Blue 90, 98, 200, 201, 202 or 226, and Direct Brown 95, 100, 112 or 170;

stilbene azo dyes such as Direct Black 62; and thiazole azo dyes such as Direct Red 9 or 11.

Examples of anthraquinone dyes and pigments include:

anthraquinone derivatives such as Basic Violet 25, Basic Blue 21, 22, 44, 45, 47, 54 or 60, Azoic Diazo Component 36, Vat Yellow 10, 13, 16, 31, 35 or 52, Vat Orange 13 or 15, Vat Red 10, 13, 16, 31, 35 or 52, Vat Violet 13 or 21, Vat Blue 4, 6, 8, 12, 14, 64, 66, 67 or 72, Vat Green 8, 13, 43, 44 or 45, Vat Brown 1, 3, 22, 25, 39, 41, 44, 46, 57, 68, 72 or 73, Vat Black 8, 14, 20, 25, 27, 36, 56, 59 or 60, Disperse Orange 11, Disperse Red 4, 9, 11, 15, 53, 55, 65, 91, 92, 100, 104, 116 or 127, Disperse Violet 1, 4, 8, 23, 26, 28, 30 or 37, Disperse Blue 1, 3, 5, 6, 7, 20, 26, 27, 54, 55, 56, 60, 61, 62, 64, 72, 73, 75, 79, 81, 87, 90, 91, 97, 98, 99, 103, 104 or 105, Disperse Yellow 51, Solvent Violet 13 or 14, Solvent Blue 11, 12, 35 or 36, Solvent Green 3, Pigment Red 83 or 89, Pigment Blue 22, Acid Violet 31, 34, 35, 41, 43, 47, 48, 51, 54, 66 or 68, Acid Blue 23, 25, 27, 40, 41, 43, 45, 54, 62, 72, 78, 80, 82, 112, 126, 127, 129, 130, 131, 138, 140, 142, 143, 182, 183, 203, 204 or 205, Acid Green 25, 27, 28, 36, 40, 41 or 44, Acid Brown 27, Acid Black 48 or 50, Mordant Red 3 or 11, Mordant Blue 8 or 48, Mordant Black 13, and Pigment Violet 5; and anthrone derivatives such as Violet Yellow 1 or 4, Violet Orange 1, 2, 3, 4, or 9, Vat Violet 1, 9 or 10, Vat Blue 18, 19 or 20, Vat Green 1, 2, 3 or 9, Vat Black 9, 13, 29 or 57, Vat Red 13, and Acid Red 80, 82 or 83.

Examples of indigo dyes and pigments include:

indigo derivatives such as Vat Blue 1, 3, 5, 35 or 41, Reduced vat Blue 1, Pigment Violet 19 or 122, Acid Blue 74 or 102, Solubilized Vat Blue 5 or 41, Solubilized Vat Black 1, and Food Blue 1; and thioindigo derivatives such as Vat Orange 5, Vat Red 1, 2 or 61, Vat Violet 2 or 3, Pigment Red 87 or 88, or Vat Brown 3.

Examples of phthalocyanine dyes and pigments include Solvent Blue 55, Pigment Blue 15, 16 or 17, Pigment Green 36, 37 or 38, Direct Blue 86 or 199, and Mordant Blue 58.

Examples of carbonium dyes and pigments include:

diphenylmethane dyes such as Basic Yellow 2;

triphenyl dyes such as Basic Red 9, Basic Violet 1, 3 or 14, Basic Blue 1, 5, 7, 119, 26, 28, 29, 40 or 41, Basic Green 1 or 4, Solvent Violet 8, Solvent 2 or 3, Pigment Violet 3, Pigment Blue 1, 2 or 3, Pigment Green 1, 2 or 7, Direct Blue 41, Acid Violet 15 or 49, Acid Blue 1, 7, 9, 15, 22, 83, 90, 93, 1100, 103 or 104, Acid Green 3, 9 or 16, Mordant Violet 1, Mordant Blue 1, 29 or 47, Food Violet 2, Food Blue 2, and Food Green 2;

xanthene dyes such as basic Red 1, Solvent Red 49, Pigment Red 81 or 90, Pigment Violet 2 or 23, Acid Red 51, 52,87,92 or 94, Mordant Red 15 or 27, Food Red 14; and acridine dyes such as Basic Orange 14 or 15;

Examples of quinoneimide dyes include:

azo dyes such as basic Red 2, Basic Black 2, Solvent Black 5 or 7, Acid Blue 59, and Acid Black 2;

oxazine dyes such as Basic Blue 3, and Direct Blue 106 or 108; and thiazine dyes such Basic Yellow 1, and Basic Blue 9, 24 or 25.

Examples of methine dyes include polymethine (or cyanine) dyes such as Basic Yellow 11, 13, 14, 19, 21, 25, 28, 33 or 35, Basic Orange 21 or 22, Basic Red 12, 13, 14, 15, 27, 29, 35, 36 or 37, and Basic Violet 7, 15, 21 or 27.

Examples of quinoline dyes include Basic Green 6, Disperse Yellow 54 or 56, Solvent Yellow 33, and Acid Yellow 3.

Examples of nitro dyes include Dispersed Yellow 1, 33, 39, 42, 49 or 54, and Acid Yellow 1.

Examples of benzoquinone and naphthoquinone dyes include Disperse Blue 58 or 108, and Acid Brown 103, 104, 1106, 160, 161, 168 or 188.

Examples of phthalimide dyes and pigments include Pigment Red 123, Vat Violet 23 or 29, and Acid Yellow 7.

Examples of perinone dyes include Violet Orange 7 or 15.

Examples of sulfide dyes include Solubilized Sulfur Yellow 2, Sulfur Yellow 4, Sulfur Orange 3, Sulfur Red 2, 3, 5 or 7, Solubilized Sulfur Blue 15, Sulfur Blue 2, 3, 4, 6, 7, 9 or 13, Sulfur Green 2, 3,6, 14 or 27, Solubilized Sulfur Brown 1, 2, 5, 6, 10, 11 or 15, Sulfur Black 1, 2, 5, 6, 10, 11 or 15, Vat Yellow 35, 42 or 43, and Vat Blue 43 or 56.

Examples of fluorescent dyes include Fluorescent Brightening Agent 14, 22, 24, 30, 32, 37, 45, 52, 54, 55, 56, 84, 85, 86, 87, 90, 91, 104, 112, 121, 134, 135, 153, 162, 163, 164, 166, 167, 168, 169, 170, 171, 172, 173, 174, 175, 176 or 177.

Examples of azoic dyes include Azoic Diazo Component 17, 20, 22, 24, 26, 31, 35, 41, 47, 48, 109 or 121, Azoic Coupling Component 2, 3, 4, 5, 7, 8, 10, 11, 12, 14, 15, 16, 17, 18, 19, 20, 23, 26,28, 29, 35, 36, 37, 41 or 108, Azoic Brown 2, 7, 11 or 15, Azoic Black 1 or 5, Azoic Yellow 1 or 2, Azoic Orange 2, 3 or 7, Azoic Red 1, 2, 6, 9, 16 or 24, Azoic Violet 1, 2, 6, 7, 9 or 10, and Azoic Green 1.

Examples of reactive dyes include Reactive Yellow 1, 2, 3, 4, 6, 7, 11, 12, 13, 14, 15, 16, 17, 18, 22, 23, 24, 25, 26, 27, 37 or 42, Reactive Orange 1, 2, 4, 5, 7, 13, 14, 15, 16, 18, 20, 23 or 24, Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 or 64, Reactive Violet 1, 2, 4, 5, 8, 9 or 10, Reactive Blue 1, 2, 3, 4, 5, 7, 8 9, 13, 14, 15, 17,18, 19, 20, 21, 25, 26, 27, 28, 29, 31, 32, 33, 34, 37, 38, 39, 40, 41, 43, 44 or 46, Reactive Green 5, 6, 7 or 8, Reactive Brown 1, 2, 5, 7, 8, 9, 10, 11, 14 or 16, Reactive Black 1, 3, 4, 5, 6, 8, 9, 10, 12, 13, 14 or 18.

When the conjugated π-bond-bearing compound is employed in combination with such a dye or pigment as mentioned hereinabove, a solution is prepared by charging them in an appropriate solvent or after dispersion or dissolution thereof in solvents. The solution should preferably have a total concentration of 0.01 wt % or over.

The solvents used for the solution include: water, and various types of organic solvents. The organic solvents include: aliphatic hydrocarbons such as gasoline, petroleum, benzine, mineral spirit, petroleum naphtha, V. M. & P., naphtha, decalin, tetralin, p-cymene, and the like; aromatic hydrocarbons such as benzene, toluene, xylene, and the like; halogenated hydrocarbons such as trichloroethylene, perchloroethylene, chloroform, carbon tetrachloride, ethylene trichloride, benzene monobromide, benzene monochloride, benzene dichloride, and the like; alcohols such as amyl alcohol, ethyl alcohol, isopropyl alcohol, 2-ethylbutyl alcohol, 2-ethylhexyl alcohol, cyclohexanol, methyl alcohol, methylamyl alcohol, benzyl alcohol, butyl alcohol, and the like; ketones such as acetone, acetonitrile, diisobutyl ketone, diethyl ketone, dipropyl ketone, methylamyl ketone, methylbutyl ketone, methylcyclohexanone, methyldipropyl ketone, methylethyl ketone, methyl-N-hexyl ketone, methylisobutyl ketone, methylpropyl ketone, mesityl oxide, and the like; esters such as acetates, butyrates, propionates, formates, and the like; alcohol esters such as butyl lactate, isopropyl lactate, ethyl lactate, ethyl oxypropionate, diethyl maleate, and the like; ketone asters such as ethyl acetoacetate, ethyl pyruvate, and the like; ethers such as isopropyl ether, ethyl ether, diethyl carbitol, diethyl cellosolve (ethylene glycol diethyl ether), butyl ether, and the like; ketone alcohols such as acetonylacetone, diacetone alcohol, dihydroxyl acetone, pyruvic alcohol, and the like; ether alcohols such as isopropyl cellosolve (ethylene glycol monoisopropyl ether), carbitol, glycidol, cellosolve (ethylene glycol monoethyl ether), glycol ether, benzyl cellosolve (ethylene glycol monobenzyl ether), butyl carbitol, butyl cellosolve (ethylene glycol monobutyl ether), methyl cellosolve (ethylene glycol monomethyl ether), triethylene glycol monoethyl ether, and the like; ketone ethers such as acetal ethyl ether, acetonyl methanol ethyl ether, methyl ethoxyethyl ether, and the like; and ester ethers such as butylcarbitol acetate, butyl cellosolve acetate (ethylene glycol monobutyl ether acetate), carbitol acetate, cellosolve acetate (ethylene glycol monoethyl acetate), 3-methoxybutyl acetate, methylcarbitol acetate, methyl cellosolve acetate (ethylene glycol monomethyl acetate), and the like.

If there are used organic solvents which are highly miscible with water, e.g. alcohols such as methyl alcohol, ethyl alcohol, allyl alcohol, n-propyl alcohol, isopropyl alcohol and the like, ketones such as acetone, acetonylacetone, diacetone alcohol and the like, esters such as ethylene glycol monomethyl ether acetate, diethylene glycol methyl ether acetate, monoethyl ether acetate and the like, ethers dioxane, ethylene glycol monomethyl ether, ethylene glycol monoethyl ether and the like, furans such as tetrahydrofuran, furfuryl alcohol and the like, and aprotic solvents acetonitrile, N,N-dimethylformamide, N,N-dimethylacetamide and the like, water is added to the solution in amounts enough not to impede the solubility and dispersability of conjugated $\pi$-bond-bearing compounds, thereby improving the economy of the solution and the safety during transportation and storage of the solution.

Moreover, phosphorus compounds such as hypophosphorus acid, pyrophosphoric acid, polyphosphoric acid and the like may be beneficially used in combination. More particularly, after treatment with a solution containing a phosphorus compound, the alloy powder may be treated with a solution of a highly conjugated, unsaturated compound. The above treatments may be reversed in order. Alternatively, the alloy powder may be treated simultaneously with both a phosphorous compound and a highly conjugated, unsaturated compound.

The manner of the treatment according to the invention is not limitative, and any known procedures including a procedure wherein a hydrogen storage alloy is immersed in a treating solution may be used in the practice of the invention. From the standpoint of treating efficiency, a hydrogen storage alloy in powder form should preferably be immersed in a treating solution. More preferably, the solution containing the alloy powder is agitated because the resultant powder exhibits better initial activity when applied to as an electrode.

The hydrogen storage alloy powder obtained by the quenching method is used as a negative electrode of a nickel hydrogen secondary battery, the capacity and life of the battery are significantly improved. Probably, this is because the highly conjugated, unsaturated compound is adsorbed to the surfaces the hydrogen storage alloy powder, which has been quenched thereby reducing segregation of constituent elements, and the powder surfaces are protected owing to the covering effect of the compound. This effect becomes greater as when the alloy surfaces to be covered are more active. In this sense, the effect becomes better when the alloy powder is treated with an acid or alkali beforehand on comparison with the case where the alloy powder is merely treated with a solution of a highly conjugated, unsaturated compound. A much better effect is attained when the highly conjugated, unsaturated compound is used together with an acid or alkali in one solution.

This is because the acid or alkali contributes to removal of a kind of impurity, such as oxides of rare earth elements, from the alloy surfaces, thereby causing the surfaces to be activated. In the case of sequential treatments, when the alloy powder is treated with a solution of the highly conjugated, unsaturated compound immediately after treatment with a mineral acid solution, a difficulty is involved, during the course of the treatments, in preventing only a slight change in quality of the alloy surfaces. In contrast, where the treatment is carried out in a solution of the highly conjugated, unsaturated compound co-existing with an acid or alkali, the alloy surfaces are activated with the highly conjugated, unsaturated compound immediately acting thereon. Thus, the alloy surfaces undergo little or no change in quality thereof, leading to the best results.

In the present invention, a mixture of intended metal elements is melted in any known furnace such as a high frequency induction furnace. The resulting melt is quenched to obtain a hydrogen storage alloy, followed by breaking into pieces, if necessary. The pieces are immersed in a solution containing a highly conjugated, unsaturated compound and dried to obtain a final powder product. For the fabrication of an electrode, a binder in latex form, e.g. polyvinyl alcohol, cellulose derivatives, PTFE, polyethylene oxide, is added to the thus obtained powder in an amount of 0.1 to 20 wt % based on the powder to provide a paste. The paste is applied to a conductive support including a three-dimensional conductive support such as fiber-shaped Ni support, expanded nickel or the like, or a two-dimensional conductive support such as punching metal, followed by drying under compression pressure to obtain an electrode. Alternatively, the paste may be compressed and shaped into a sheet or plate, followed by winding it about a conductive support and bonding them together under compression pressure to obtain an electrode.

As will be apparent from the foregoing, a hydrogen storage alloy powder, which exhibits high activity and is excellent storage and handling properties, can be obtained by a very simple manner. Using the alloy powder, there can be obtained a nickel hydrogen storage alloy secondary battery having high capacity and long life.

The invention is more particularly described by way of examples. Comparative examples are also shown.

Test Nos. 1 to 9 (Comparative Examples) and Test Nos. 10 to 42 (Examples)

1) Misch metal, Mm, composed of 61 wt % of La, 7 wt % of Ce, 23 wt % of Pr and 9 wt % of Nd was provided. Al, Co, Mn and Ni were, respectively, weighed in amounts by atomic ratio to 1.00 of Mm, of 0.30, 0.75, 0.20 and 3.75.

These elemental components were melted in an atmosphere of argon in a high-frequency melting furnace. The resultant melt was injected against a single roll of 400 mm in diameter being rotated at a high speed of 3,000 r.p.m. to obtain a ribbon of a hydrogen storage alloy. For comparison, the melt was cast.

When using the single roll, the cooling rate was found to be $4 \times 10^4$/second. The ribbon was subjected to XRD to calculate a lattice strain according to the Wilson method, revealing that the strain was 0.065%. In the case of the casting, the strain was 0.145%.

The hydrogen storage alloy ribbon was thermally treated at 900° C., and broken into pieces in a ball mill, followed by passing through a sieve with a 75 μm mesh to obtain a powder product having an average particle size of 30 μm.

1-1) Surface treatment

The two types of powders obtained according to different quenching methods including a casting method (only for comparison) and a single roll method were, respectively, treated under different surface treating conditions using various types of treating solutions. The powders obtained by the casting method were used in Test Nos. 1, 3, 4, and 7 to 9 and the powders used in the other tests were obtained by the quenching method.

The surface treating conditions of powder in the respective tests are summarized below.

Test No. 1: not surface treated (abbreviated as H in Table 1 appearing hereinafter).

Test No. 2: not surface treated (H).

Test No. 3: 1 kg of hydrogen storage alloy powder and 10 liters of 0.15N hydrochloric acid solution were mixed and agitated at 60° C. for 0.5 hours, followed by filtration an d drying (abbreviated as F in Table 1).

Test No. 4: 2 kg of hydrogen storage alloy powder and 1 liter of 6N potassium hydroxide solution were mixed and agitated at 110° C. for 5 hours, followed by filtration an d drying (abbreviated as G in Table 1).

Test No. 5: treated in the same manner as in Test No. 3 (F).

Test No. 6: treated as in Test No. 4 (G) Test No. 7: 2 kg of hydrogen storage alloy powder and 1 liter of solution A containing 1 wt % of a sulfonated product (hereinafter abbreviated as R) of azine dye (C.I. Solvent Black 5 with $\overline{M_w}$=500) dissolved in a mixed solvent of toluene and methyl alcohol at a ratio by volume of 1:1 were mixed and agitated at 60° C. for 1 hour, followed by filtration and drying (hereinafter referred to simply as Treatment A).

Test No. 8: treated as in Treatment A except that hydrochloric acid was added to the solution A so that the concentration of HCl was 0.15N.

Test No. 9: treated as in Treatment A except that potassium hydroxide was added to solution A so that solution A was made alkaline at a concentration of 6N KOH and that the agitation was performed at 110° C. for 5 hours.

Test Nos. 1 to 9 are for comparison.

The following tests are inventive ones.

Test No. 10: treated as in Treatment A of Test No. 7.

Test No. 11: treated as in Treatment A except that HCl was added to solution A to render solution A acidic at an HCl concentration of 0.05N and that the agitation was under conditions of 63° C. and 1 hour.

Test No. 12: treated as in Test No. 11 except that the HCl concentration was at 0.15 and the agitation was under conditions of 61° C. and 1 hour.

Test No. 13: treated as in Test No. 11 except that the HCl concentration was at 1.

Test No. 14: treated as in Test No. 11 except that the HCl concentration was at 1.5 and the agitation was under conditions of 56° C. and 1 hour.

Test No. 15: treated as in Test No. 12 using sulfuric acid in place of HCl agitating conditions of 60° C. and 1 hour.

Test No. 16: treated as in Test No. 12 using nitric acid in place of HCl and agitating conditions of 59° C. and 1 hour.

Test No. 17: treated as in Test No. 12 using agitating conditions of 130° C. and 1 hour.

Test No. 18: treated as in Test No. 12 using agitating conditions of 155° C. and 1 hour.

Test No. 19: 10 liters of 0.15N HCl solution and 1 kg of hydrogen storage alloy powder were mixed and agitated, after which 1 liter of solution A containing 1 wt % of R, defined in Test No. 7, and 2 kg of the alloy powder obtained after the agitation were mixed and agitated at room temperature for 1 hour, followed by filtration and drying.

Test No. 20: treated as in Treatment A except that a solution containing 0.01 wt % of R, defined in Test No. 7, was rendered alkaline at 6N by means of KOH and that the agitation was under 107° C. and 5 hours.

Test No. 21: treated as in Test No. 20 except that the concentration of R was 0.02 wt % and the agitation was under conditions of 110° C. and 5 hours.

Test No. 22: treated as in Test No. 20 except that the concentration of R was 1 wt % and the agitation was under conditions of 111° C. and 5 hours.

Test No. 23: treated as in Test No. 20 except that the concentration of R was 10 wt % and the agitation was under conditions of 109° C. and 5 hours.

Test No. 24: treated as in Test No. 20 except that the concentration of R was 13 wt % and the agitation was under conditions of 110° C. and 5 hours.

Test No. 25: treated as in Test No. 22 except that KOH was at 0.1N in oncentration and the agitation was under conditions of 110° C. and 5 hours.

Test No. 26: treated as in Test No. 25 except that KOH was at 1N in oncentration and the agitation was under conditions of 108° C. and 5 hours.

Test No. 27: treated as in Test No. 25 except that KOH was at 10N in oncentration and the agitation was under conditions of 112° C. and 5 hours.

Test No. 28: treated as in Test No. 25 except that KOH was at 12N in concentration.

Test No. 29: treated as in Test No. 22 except that NaOH was used in place of KOH and the agitation was under conditions of 110° C. and 5 hours.

Test No. 30: treated as in Test No. 29 except that LiOH was used in place of KOH to make a 1N LiOH solution and the agitation was under conditions of 113° C. and 5 hours.

Test No. 31: treated as in Test No. 22 except that a mixture of potassium hydroxide and lithium hydroxide at a ratio by weight of 9:1 was used in place of potassium hydroxide and that the agitation was under conditions of 110° C. and 5 hours.

Test No. 32: treated as in Test No. 22 using agitation conditions of 131° C. and 5 hours.

Test No. 33: treated as in Test No. 22 using agitation conditions of 156° C. and 5 hours.

Test No. 34: treated as in Test No. 22 except that azo dye (C.I. Solvent Black 3), 2,3-dihydro-2,2-dimethyl-6[1- naphthyl-4-[phenylazo]azo]-1H-pyrimidine ($\overline{Mw}$=400)(hereinafter abbreviated as D1), dissolved in methyl alcohol, was used in place of R and that the agitation was under conditions of 110° C. and 5 hours.

Test No. 35: treated as in Test No. 22 except that amine/quinone condensate, i.e. 1,8-diaminonaphthaleneparaquinone condensate ($\overline{Mw}$=1000)(hereinafter abbreviated as DPQ), dissolved in a mixed solvent of 1-methyl-2-pyrrolidone and methyl alcohol at a ratio by volume of 1:1, was used in place of R.

Test No. 36: treated as in Test No. 22 except that azine dye (C. I. Solvent Black 5, $\overline{Mw}$=500) (hereinafter abbreviated as D2), dissolved in a mixed solvent of toluene and methyl alcohol at a ratio by volume of 1:1, was used in place of R.

Test No. 37: treated as in Test No. 22 except that phenothiazine, dissolved in methyl alcohol, was used in place of R and that the agitation was under conditions of 110° C. and 5 hours.

Test No. 38: treated as in Test No. 22 except that a mixture of R and D2 at a mixing ratio by weight of 1:1 was used in place of R and that the agitation was under conditions of 109° C. and 5 hours.

Test No. 39: treated as in Test No. 19 except that a 6N potassium hydroxide solution was used in place of the hydrochloric acid solution, and one liter of the solution was mixed with 2 kg of hydrogen storage alloy powder and that the agitation was under conditions of 110° C. and 5 hours.

Test No. 40: treated as in Test No. 39 except that the agitation was under conditions of 150° C. and 5 hour.

Test No. 41: an alloy melt having such an alloy composition of 1) described hereinbefore was obtained in the same manner as in 1), followed by quenching according to a gas atomizing method using Ar at a quenching rate of $8.0 \times 10^{3\circ}$ C./second to obtain alloy powder having an average size of 32 $\mu$m; the powder had a lattice strain of 0.070%; and the powder was treated as in Test No. 22 using agitation conditions of 109° C. and 5 hours.

Test No. 42: an alloy melt having such an alloy composition of 1) described hereinbefore was obtained in the same manner as in 1), followed by quenching according to a rotating disc method at a rate of $3.0 \times 10^{4\circ}$ C./second to obtain alloy powder having an average size of 42 $\mu$m; the powder had a lattice strain of 0.083%; and the powder was treated as in Test No. 22 using agitation conditions of 110° C. and 5 hours.

1-2) Fabrication of battery 2 g of each of the powders of Test Nos. 1 to 42 was weighed, to which 0.5 g of an aqueous solution of 3% by weight of polyvinyl alcohol having an average degree of polymerization of 2000 and a degree of saponification of 98 mol % was added, followed by mixing to obtain a paste. The thus obtained paste was applied to a fibrous Ni support and dried, followed by press molding to obtain a 0.5 mm thick negative electrode. Using this negative electrode, a sintered nickel positive electrode made according to a known method and provided as a nickel oxide positive electrode, and a polypropylene non-woven fabric separator, and a 6N potassium hydroxide aqueous solution as a liquid electrolyte, an open nickel-hydrogen secondary battery regulated at the negative electrode was made. The battery was subjected to measurements of discharge capacity and cycle life characteristics including a shelf life characteristic and evaluated as follows.

Evaluation of discharge capacity and cycle life characteristics:

A battery sample was subjected to repetition of charge and discharge cycle wherein the sample was charged at a constant temperature of 20° C. under conditions of 180 mA and 5 hours and discharged at a current of 120 mA to a battery voltage of 1.0 V. The capacity determined at the tenth cycle was taken as initial capacity, and the cycle life was assessed as a ratio of the discharge capacity at the 200th cycle to that at the 10th cycle.

Evaluation of shelf life characteristic:

Each alloy powder was stored at room temperature over two months and subjected to measurements of discharge capacity and cycle life characteristics in the same manner as set out above.

The results are shown in Tables 1 to 4 wherein surface treating conditions and the manner of quenching are also shown.

TABLE 1

| | | Surface Treatment | | | | | Discharge Capacity at | |
|---|---|---|---|---|---|---|---|---|
| Test No. | Quenching Method | Chemicals Used | Treating Temperature (° C.) | Treating Time (hours) | Discharge Capacity at 10th Cycle (mAh/g) | Cycle Life (%) | 10th Cycle After Standing (mAh/g) | Cycle Life (%) |
| 1 | casting | non-treated | — | — | 291 | 70 | 282 | 69 |
| 2 | single roll | non-treated | — | — | 220 | 86 | 210 | 81 |
| 3 | casting | 0.15N HCl | 60 | 0.5 | 290 | 62 | 280 | 55 |
| 4 | casting | 6N KOH | 110 | 5 | 290 | 65 | 285 | 60 |
| 5 | single roll | 0.15N HCl | 60 | 0.5 | 280 | 75 | 270 | 65 |
| 6 | single roll | 6N KOH | 110 | 5 | 276 | 77 | 271 | 66 |
| 7 | casting | R° (1 wt %) | 60 | 1 | 320 | 80 | 321 | 78 |
| 8 | casting | 0.15N HCl + 1 wt % R | 60 | 1 | 326 | 78 | 325 | 75 |
| 9 | casting | 6N KOH + 1 wt % R | 110 | 5 | 323 | 80 | 323 | 77 |

Note *: R = sulfonated product of azine dye (C.I. Solvent Black 5 with $M_w$ = 500) dissolved in a mixed solvent of toluene and methyl alcohol at a ratio by volume of 1:1.

TABLE 2

| Test No. | Quenching Method | Surface Treatment Chemicals Used | Treating Temperature (° C.) | Treating Time (hours) | Discharge Capacity at 10th Cycle (mAh/g) | Cycle Life (%) | Discharge Capacity at 10th Cycle After Standing (mAh/g) | Cycle Life (%) |
|---|---|---|---|---|---|---|---|---|
| 10 | single roll | 1 wt % R | 60 | 1 | 322 | 93 | 322 | 92 |
| 11 | " | 0.05N HCl + 1 wt % R | 63 | 1 | 295 | 81 | 293 | 79 |
| 12 | " | 0.15N HCl + 1 wt % R | 61 | 1 | 329 | 90 | 328 | 88 |
| 13 | " | 1N HCl + 1 wt % R | 60 | 1 | 320 | 89 | 317 | 87 |
| 14 | " | 1.5N HCl + 1 wt % R | 56 | 1 | 294 | 81 | 293 | 79 |
| 15 | " | 0.15N $H_2SO_4$ + 1 wt % R | 60 | 1 | 326 | 89 | 324 | 88 |
| 16 | " | 0.15N $HNO_3$ + 1 wt % R | 59 | 1 | 324 | 88 | 321 | 87 |
| 17 | " | 0.15N HCl + 1 wt % R | 130 | 1 | 326 | 87 | 324 | 86 |
| 18 | " | 0.15N HCl + 1 wt % R | 155 | 1 | 305 | 83 | 301 | 82 |
| 19 | " | 0.15N HCl + 1 wt % R | 60 | 1 | 325 | 88 | 321 | 86 |

TABLE 3

| Test No. | Quenching Method | Surface Treatment Chemicals Used | Treating Temperature (° C.) | Treating Time (hours) | Discharge Capacity at 10th Cycle (mAh/g) | Cycle Life (%) | Discharge Capacity at 10th Cycle After Standing (mAh/g) | Cycle Life (%) |
|---|---|---|---|---|---|---|---|---|
| 20 | single roll | 6N KOH + 0.01 wt % R | 107 | 5 | 304 | 82 | 299 | 81 |
| 21 | " | 6N KOH + 0.02 wt % R | 110 | 5 | 325 | 88 | 320 | 86 |
| 22 | " | 6N KOH + 1 wt % R | 111 | 5 | 327 | 90 | 326 | 89 |
| 33 | " | 6N KOH + 10 wt % R | 109 | 5 | 326 | 91 | 325 | 90 |
| 24 | " | 6N KOH + 13 wt % R | 110 | 5 | 298 | 81 | 298 | 80 |
| 25 | " | 0.1N KOH + 1 wt % R | 110 | 5 | 281 | 80 | 279 | 79 |
| 26 | " | 1N KOH + 1 wt % R | 108 | 5 | 320 | 89 | 320 | 88 |
| 27 | " | 10N KOH + 1 wt % R | 112 | 5 | 323 | 87 | 321 | 86 |
| 28 | " | 11N KOH + 1 wt % R | 110 | 5 | 297 | 83 | 293 | 82 |
| 29 | " | 6N NaOH + 1 wt % R | 110 | 5 | 327 | 89 | 325 | 89 |
| 30 | " | 1N LiOH + 1 wt % R | 113 | 5 | 320 | 90 | 319 | 90 |

TABLE 4

| Test No. | Quenching Method | Surface Treatment Chemicals Used | Treating Temperature (° C.) | Treating Time (hours) | Discharge Capacity at 10th Cycle (mAh/g) | Cycle Life (%) | Discharge Capacity at 10th Cycle After Standing (mAh/g) | Cycle Life (%) |
|---|---|---|---|---|---|---|---|---|
| 31 | single roll | 6N (KOH + LiOH) at 9:1 + 1 wt % R | 110 | 5 | 327 | 90 | 327 | 88 |

TABLE 4-continued

| Test No. | Quenching Method | Chemicals Used | Surface Treatment Treating Temperature (° C.) | Treating Time (hours) | Discharge Capacity at 10th Cycle (mAh/g) | Cycle Life (%) | Discharge Capacity at 10th Cycle After Standing (mAh/g) | Cycle Life (%) |
|---|---|---|---|---|---|---|---|---|
| 32 | " | 6N KOH + 1 wt % R | 131 | 5 | 325 | 88 | 322 | 87 |
| 33 | " | 6N KOH + 1 wt % R | 156 | 5 | 299 | 84 | 295 | 82 |
| 34 | " | 6N KOH + 1 wt % D1** | 110 | 5 | 326 | 89 | 326 | 88 |
| 35 | " | 6N KOH + 1 wt % DPQ1**** | 111 | 5 | 325 | 92 | 324 | 80 |
| 36 | " | 6N KOH + 1 wt % D2**** | 111 | 5 | 326 | 90 | 325 | 90 |
| 37 | " | 6N KOH + 1 wt % D3***** | 110 | 5 | 322 | 88 | 321 | 88 |
| 38 | " | 6N KOH + 1 wt % (D2 + R) at 1:1 | 109 | 5 | 327 | 90 | 327 | 88 |
| 39 | " | 6N KOH + 1 wt % R | 110 | 5 | 323 | 89 | 321 | 87 |
| 40 | " | 6N KOH + 1 wt % R | 150 | 5 | 321 | 88 | 320 | 86 |
| 41 | gas atomization | 6N KOH + 1 wt % R | 109 | 5 | 326 | 90 | 326 | 89 |
| 42 | rotary disc | 6N KOH + 1 wt % R | 110 | 5 | 327 | 92 | 326 | 91 |

Note:
**D1 = azo dye (C.I. Solvent Black 3), 2,3-dihydro-2,2-dimethyl-6[1-naphthyl-4-[phenylazo]azo]-1H-pyrimidine ($\overline{M_w} \approx 400$) dissolved in methyl alcohol.
***DPQ = amine/quinone condensate, i.e. 1,8-diaminonaphthaleneparaquinone condensate ($\overline{M_w} = 1000$) dissolved in a mixed solvent of 1-methyl-2-pyrrolidone and methyl alcohol at a ratio by volume of 1:1.
****D2 = azine dye (C. I. Solvent Black 5, $\overline{M_w} = 500$) (hereinafter abbreviated as D2), dissolved in a mixed solvent of toluene and methyl alcohol at a ratio by volume of 1:1.
*****D3 = phenothiazine dye dissolved in methyl alcohol The results of Test Nos. 1, 2, 10, 12 and 22 reveal that the hydrogen storage alloy powders of the invention have better shelf life characteristics along with higher discharge capacity and better cycle life.

The results of Test Nos. 7 and 10 demonstrate that when the powder is treated with the solution containing the highly conjugated, unsaturated compound after quenching, the cycle life is significantly improved.

From the results of Test Nos. 3, 5, 8 and 12, it will be seen that when the powder is quenched and treated with the acidic solution containing the highly conjugated, unsaturated compound, not only the shelf life characteristics are better, but also high discharge capacity and good cycle life characteristics are obtained.

From the results of Test Nos. 11 to 14, a7 and 18, it will be seen that the acid concentration of 0.1 to 1N and the treating temperature ranging from room temperature to 150° C. are preferred, resulting in the batteries having high capacity and long cycle life. Likewise, the results of test Nos. 12, 15 and 16 reveal that sulfuric acid and nitric acid are both useful as well as hydrochloric acid. The results of Test No. 19 reveal that the purposes of the invention can be attained when the acid treatment and the treatment with the solution containing the highly conjugated, unsaturated compound are separately carried out.

In comparing the results of Test Nos. 4, 6, 9 and 22, it will be seen that where the powder is quenched and treated with an alkaline solution of the highly conjugated, unsaturated compound, the shelf life characteristics are better along with better cycle life characteristics while keeping high discharge capacity. Likewise, the results of Test Nos. 20 to 24 reveal that the shelf life characteristics are particularly good when the concentration of the highly conjugated, unsaturated compound is in the range of 0.01 to 10% by weight based on the alloy power.

From the results of test Nos. 25 to 28, 32 and 33, it will be seen that high discharge capacity and long cycle life are ensured when the concentration of the alkali is in the range of 1 to 10 N and the treating temperature ranges from room temperature to 150° C. The results of test Nos. 22, 29 to 21 reveal that when sodium hydroxide and/or lithium hydroxide is used alone or in combination with potassium hydroxide, similar results as obtained by use of potassium hydroxide are expected.

The results of Test Nos. 22, 34 to 38 reveal that where a highly conjugated, unsaturated compound having five or more conjugated π-bonds and a molecular weight of 100 or over is used, the shelf life characteristics are good along with good discharge capacity and cycle life characteristics. The results of Test Nos. 39 and 40 reveal that the purposes of the invention can also be achieved when the alkali treatment and the treatment with a solution containing the highly conjugated, unsaturated compound are separately performed.

Finally, the results of Test Nos. 41 and 42 reveal that similar results are obtained when using the gas atomizing method and the rotary disc method.

What is claimed is:

1. A method for making hydrogen storage alloy powder which comprises quenching a melt of a hydrogen storage alloy, breaking the quenched alloy into fine pieces provided that said alloy is in non-powder form after the quenching, and subjecting said fine pieces to treatment with a solution containing a conjugated unsaturated compound which has five or more conjugated π bonds in the molecule and a molecular weight of 100 or above.

2. A method according to claim 1, wherein prior to the treatment with said solution, said fine pieces are treated with an acidic or alkaline solution.

3. A method according to claim 2, wherein said fine pieces are treated with an acidic solution comprising at least one acid selected from the group consisting of hydrochloric acid, sulfuric acid and nitric acid.

4. A method according to claim 3, wherein said acidic solution has a concentration of 0.1 to 1N.

5. A method according to claim 2, wherein said fine pieces are treated with an alkaline solution comprising at least one alkali selected from the group consisting of lithium hydroxide, sodium hydroxide and potassium hydroxide.

6. A method according to claim 5, wherein said alkaline solution has a concentration of 1 to 10 N.

7. A method according to claim 1, wherein said solution is rendered acidic by addition of at least one acid selected from the group consisting of hydrochloric acid, sulfuric acid and nitric acid at a concentration of 0.1 to 1 N in said solution.

8. A method according to claim 1, wherein said solution is rendered alkaline by addition of at least one alkali selected from the group consisting of lithium hydroxide, sodium hydroxide and potassium hydroxide at a concentration of 1 to 10 N in said solution.

9. A method according to claim 1, wherein said hydrogen storage alloy is of the formula, $(La)_x R_{1-x} Ni_a M_b$, in which R represents at least one element selected from Ce, Pr and Nd, M represents at least one element selected from Al, Co, Cu, Fe, Mn, Ti and Zr, x is a value of 0.2 to 1, (a+b) is a value of 4.0 to 6.0 provided that $0 < b \leq 2.0$.

10. A method according to claim 1, wherein said melt is quenched by a rotating roll method, a gas atomizing method or a rotary disc method.

11. A method according to claim 1, wherein the fine pieces obtained after the quenching has a lattice strain of 0.1% or below when calculated according to the powder X-ray diffractometry.

12. A method according to claim 1, wherein the treatment with said solution is effected at room temperature to 150° C.

13. A method according to claim 1, wherein said conjugated unsaturated compound is present in said solution in an amount of 0.01 to 10 parts by weight per 100 parts by weight of said fine pieces.

14. A method according to claim 1, wherein prior to, after or simultaneously with the treatment with said solution, said fine pieces are treated with a phosphorus compound.

15. A method according to claim 1, further comprising thermally treating the quenched alloy at a temperature of 800 to 1200° C. for 5 to 12 hours prior to the treatment with said solution.

16. An electrode comprising a hydrogen storage alloy powder obtained by the method defined in claim 1.

* * * * *